United States Patent [19]

Kitamura et al.

[11] Patent Number: 4,805,034
[45] Date of Patent: Feb. 14, 1989

[54] COLOR VIDEO SIGNAL TRANSMISSION SYSTEM

[75] Inventors: Hiroyuki Kitamura, Hiratsuka; Yoshihiko Ota, Yokosuka, both of Japan

[73] Assignee: Victor Company of Japan, Ltd., Kanagawa, Japan

[21] Appl. No.: 945,772

[22] Filed: Dec. 23, 1986

[30] Foreign Application Priority Data

Dec. 28, 1985 [JP] Japan ................... 60-299076
Dec. 28, 1985 [JP] Japan ................... 60-299077
Jan. 24, 1986 [JP] Japan ................... 61-14304
Jan. 24, 1986 [JP] Japan ................... 61-14305

[51] Int. Cl.⁴ ............................................. H04N 9/79
[52] U.S. Cl. ................................. 358/310; 358/312; 358/319; 358/343; 358/320
[58] Field of Search ............... 358/310, 312, 314, 343, 358/320, 37, 335, 337; 360/10.1, 33.1

[56] References Cited

U.S. PATENT DOCUMENTS 4,656,527 4/1987 Uchimi .................. 358/310
4,677,461 6/1987 Mitzutani et al. ........... 358/37
4,706,113 11/1987 Ito et al. .................. 358/37

Primary Examiner—L. T. Hix
Assistant Examiner—D. Rutledge
Attorney, Agent, or Firm—Michael N. Meller

[57] ABSTRACT

A color video signal transmission system comprises an analog-to-digital converter for sampling an input composite color video signal at a sampling frequency $nf_{sc}$ and for producing first data, where n is a natural number and $f_{sc}$ denotes a chrominance subcarrier frequency of the input composite color video signal, a data converter for converting the first data into n data groups each comprising sampled data in the first data obtained for every sampling period $1/f_{sc}$ and having the same phase with respect to the chrominance subcarrier of the input composite color video signal within one horizontal scanning period and for producing second data in which all of the n data groups are arranged in series for each horizontal scanning period, and a digital-to-analog converter for converting the second data into an analog video signal and for supplying the analog video signal to a transmission medium.

18 Claims, 11 Drawing Sheets

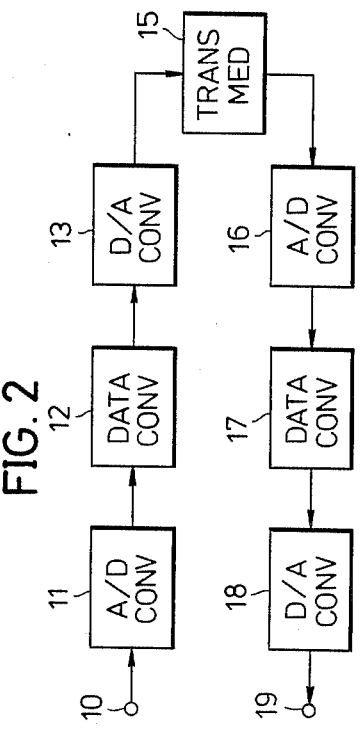
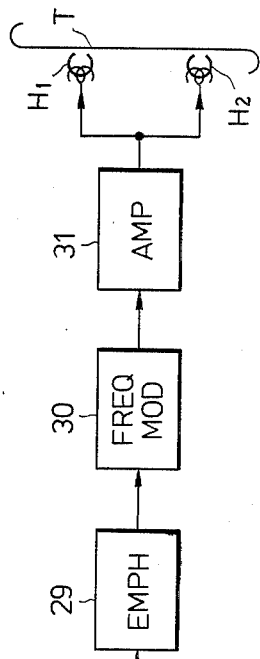
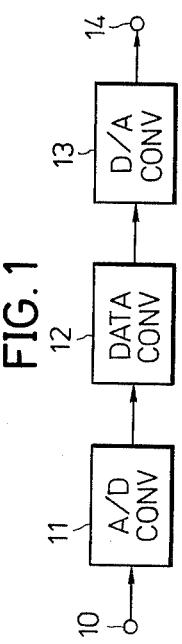
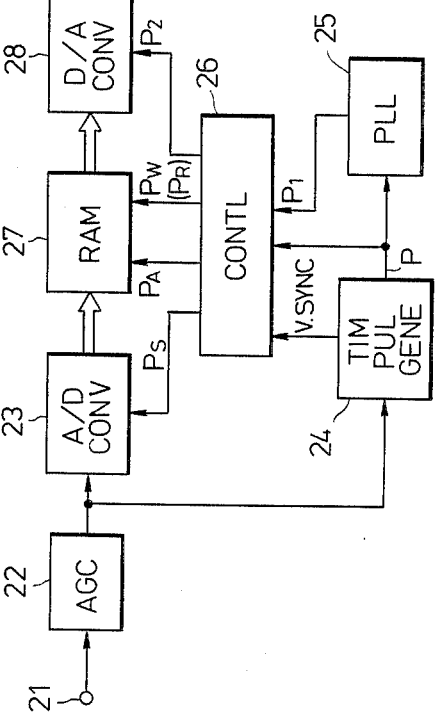

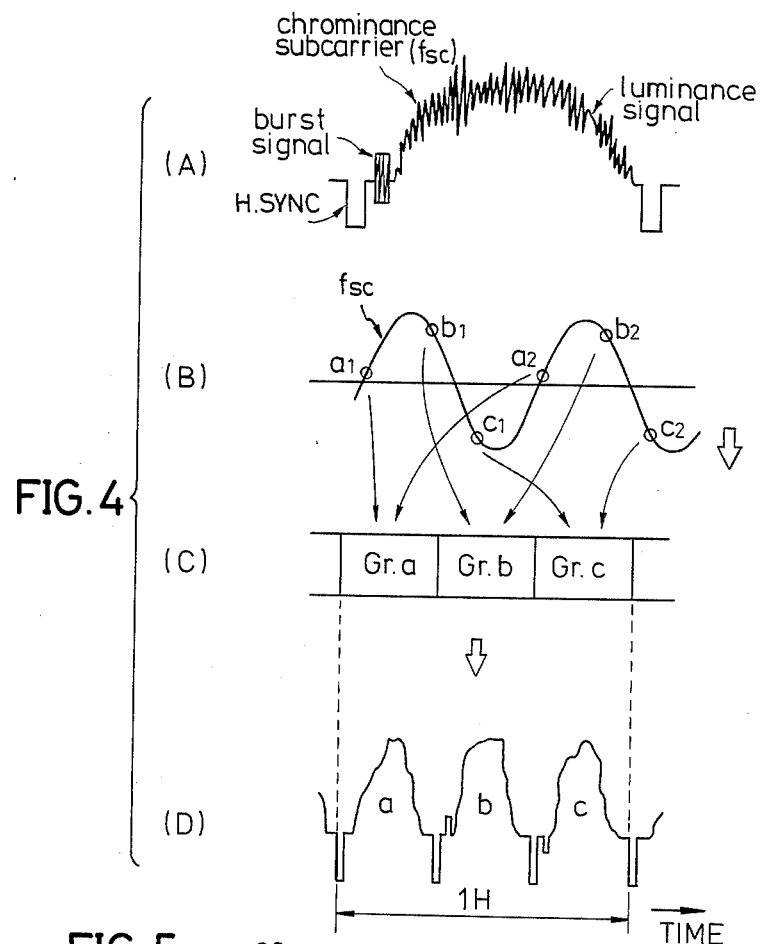
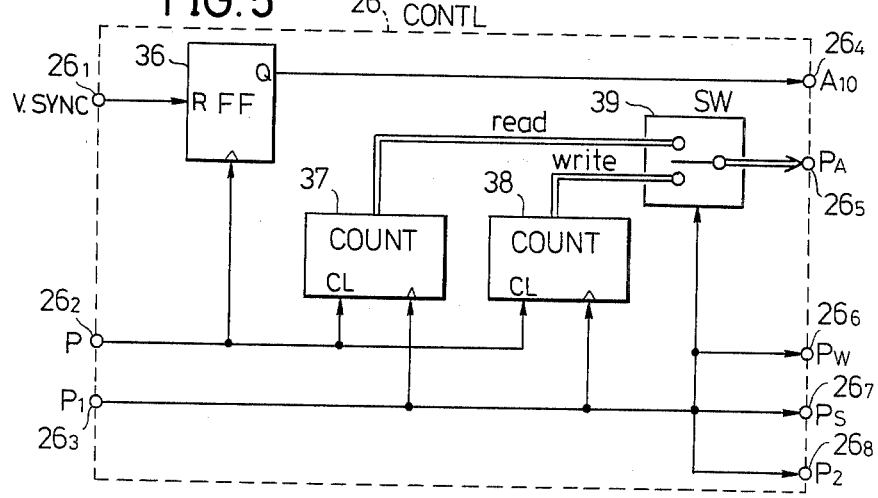

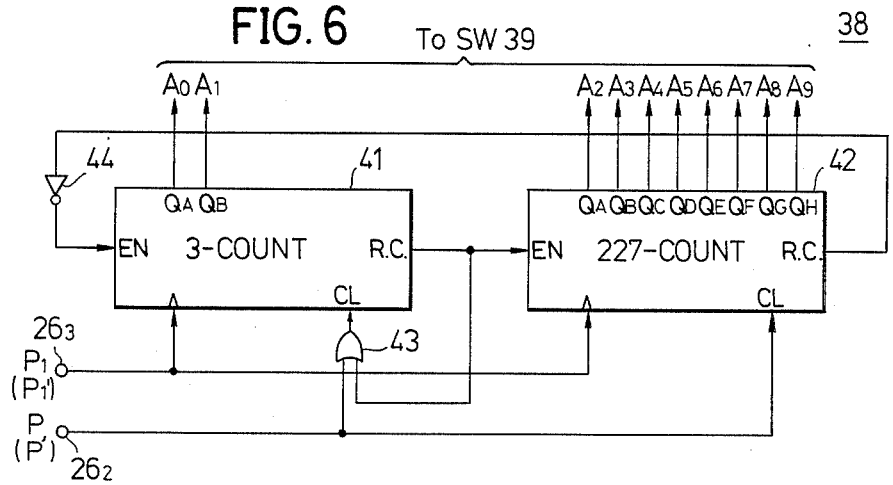
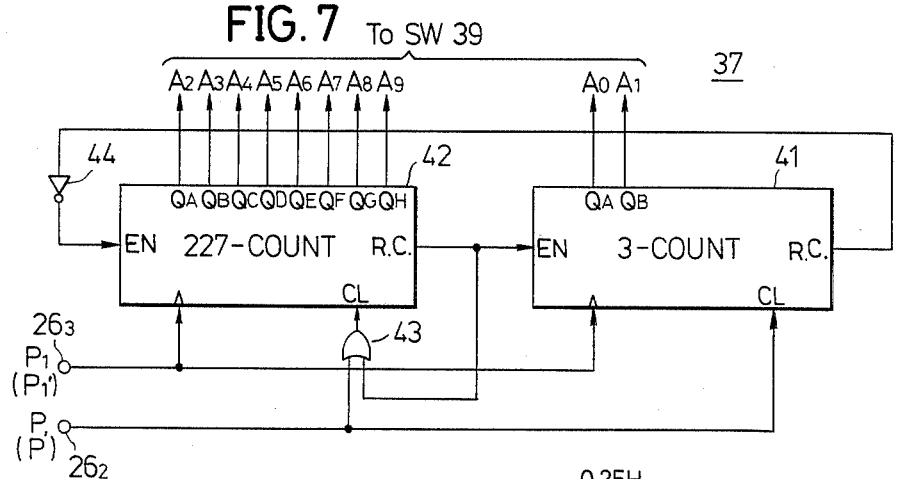
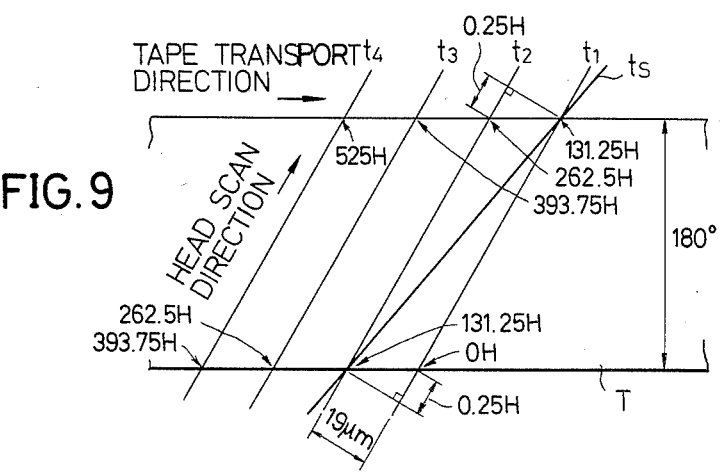

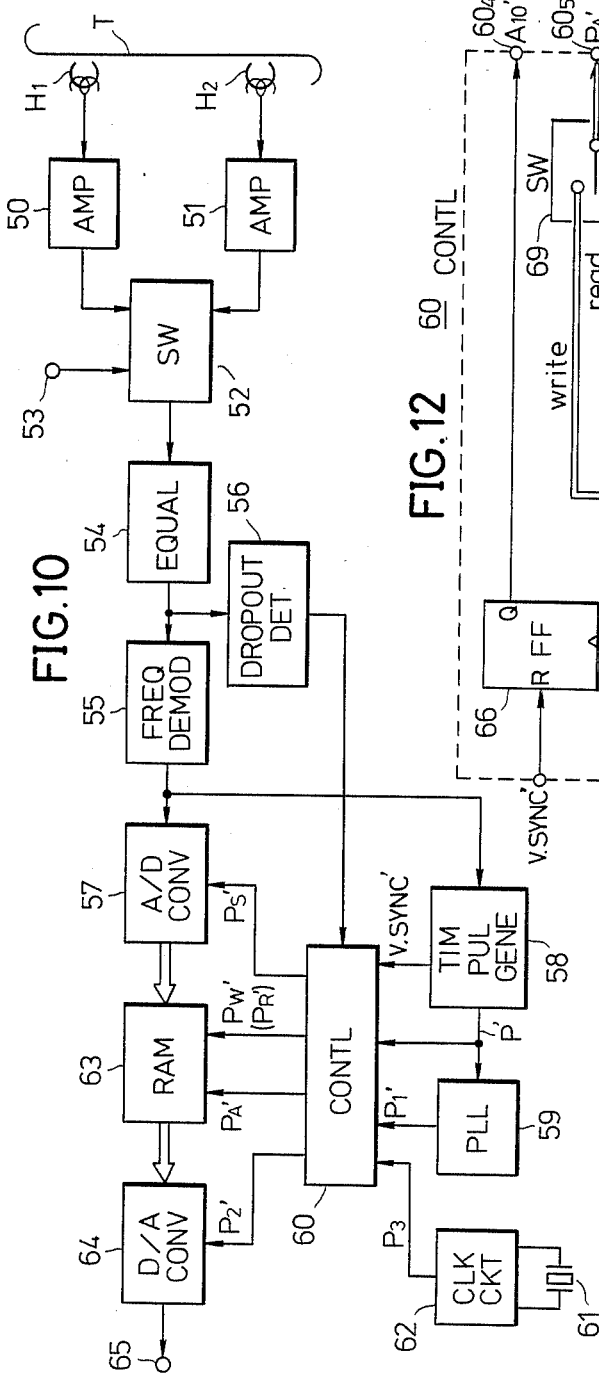
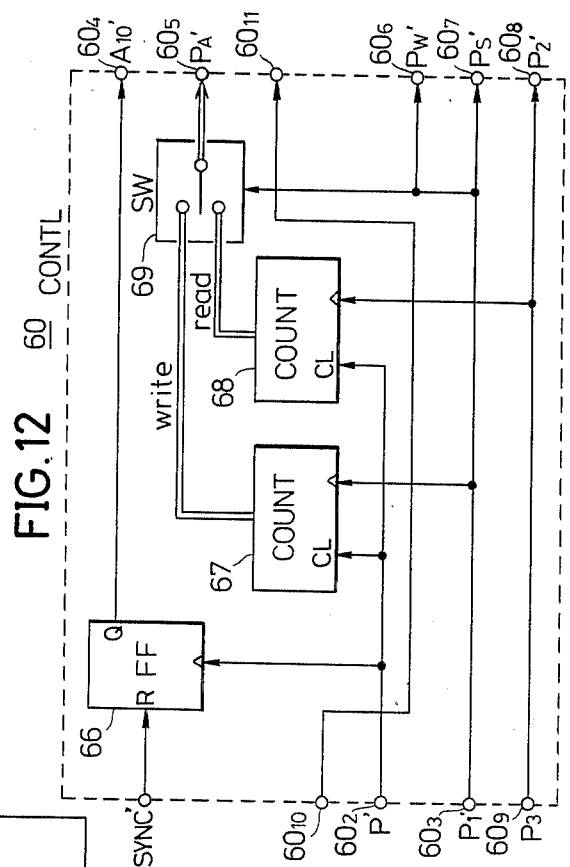

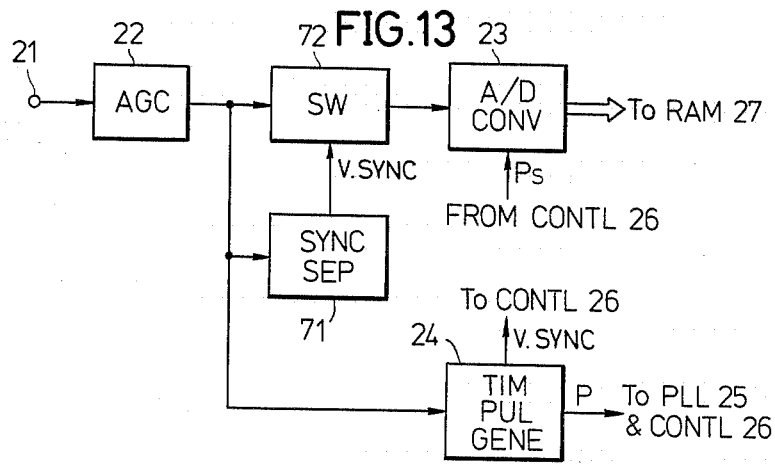
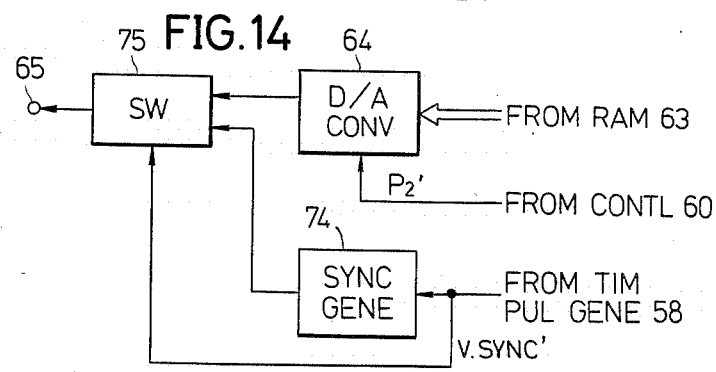
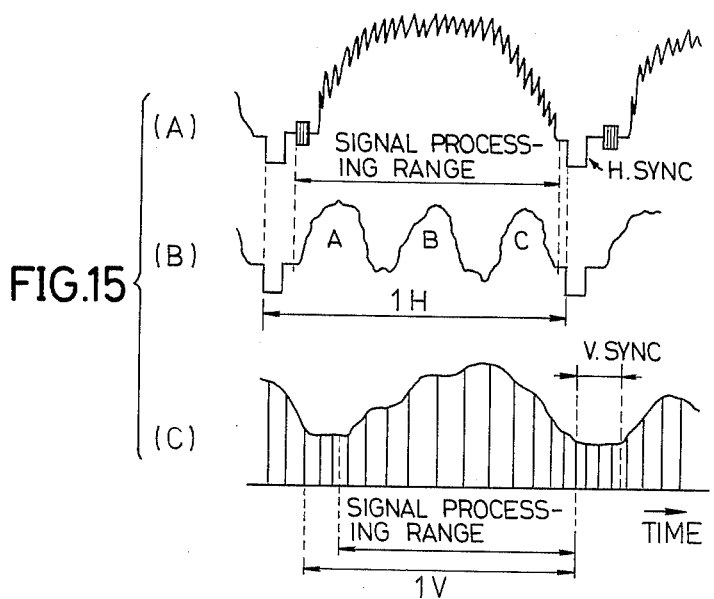

COLOR VIDEO SIGNAL TRANSMISSION SYSTEM

BACKGROUND OF THE INVENTION

The present invention generally relates to color video signal transmission systems, and more particularly to a color video signal transmission system which converts a composite color video signal into a pseudo component coded signal having the form of a special component coded signal and having no chrominance subcarrier and transmits the pseudo component coded signal to a transmission medium.

Generally, when processing a composite color video signal in a video tape recorder (hereinafter simply referred to as a VTR), it is necessary to take into consideration the effects of time base deviation (jitter), frequency band and waveform distortion. The so-called direct FM recording system (or direct color processing system) employed in the VTR for broadcasting use copes with the above three points without compromise, but the color video signal must be frequency-modulated directly, and the FM color video signal must be recorded on and reproduced from a tape which is transported at such a speed that the relative speed between the tape and a head is in the range of 2 m/sec to 40 m/sec and high. As a result, there are problems in that the mechanism of the VTR must have a high precision, circuits of the VTR become of large scale, and a large quantity (length) of tape is required to carry out the recording and reproduction.

On the other hand, the so-called color under system is employed in the VTR for commercial or industrial use and in the VTR for home use. In this case, the relative speed between the tape and the head is in the order of a few m/sec and low. In addition, a luminance signal and a carrier chrominance signal are separated from the color video signal, and the luminance signal is frequency-modulated. The carrier chrominance signal is frequency-converted into a frequency band with a center frequency in the vicinity of 600 kHz to 700 kHz which is lower than that of a frequency band of the frequency modulated (FM) luminance signal. The FM luminance signal and the frequency converted carrier chrominance signal are frequency-division-multiplexed and recorded on and reproduced from the tape. For this reason, the problems of the VTR for broadcasting use are reduced according to the VTR for commercial or industrial use (or for home use).

The direct FM recording system and the color under system described before may be considered as being a kind of color video signal transmission system. But in the color video signal transmission system employing the color under system, there is a problem in that, out of the total information contained in the color video signal, the information which is actually transmitted is only in the order of ½ the total information. Therefore, because only approximately ½ the total information is transmitted, the VTR for home use and the like employing the color under system suffers problems in that the resolution of a reproduced picture is unsatisfactory and lacks sharpness and detail, and that the color resolving power is unsatisfactory.

SUMMARY OF THE INVENTION

Accordingly, it is a general object of the present invention to provide a novel and useful color video signal transmission system in which the problems described heretofore are eliminated.

Another and more specific object of the present invention is to provide a color video signal transmission system comprising analog-to-digital (A/D) converting means for sampling an input composite color video signal at a sampling frequency $nf_{sc}$ and for producing first data, where n is a natural number and $f_{sc}$ denotes a chrominance subcarrier frequency of the input composite color video signal, data converting means for converting the first data into n data groups each comprising sampled data in the first data obtained for every sampling period $1/f_{sc}$ and having the same phase with respect to the chrominance subcarrier of the input composite color video signal within one horizontal scanning period and for producing second data in which all of the n data groups are arranged in series for each horizontal scanning period, and digital-to-analog (D/A) converting means for converting the second data into an analog video signal and for supplying the analog video signal to a transmission medium. According to the transmission system of the present invention, it is possible to obtain a high resolution because the composite color video signal is not transmitted in a state separated into the luminance signal and the carrier chrominance signal.

Still another object of the present invention is to provide a color video signal transmission system in which the above described A/D converting means produces the first data by sampling only a video information portion of the composite color video signal, excluding horizontal and/or vertical synchronizing signal portions of the composite color video signal. According to the transmission system of the present invention, it is easy to discriminate and identify each horizontal scanning period of the transmitted signal.

A further object of the present invention is to provide a color video signal transmission system comprising first A/D converting means for sampling an input composite color video signal at a sampling frequency $nf_{sc}$ and for producing first data, where n is a natural number and $f_{sc}$ denotes a chrominance subcarrier frequency of the input composite color video signal, first data converting means for converting the first data into n data groups each comprising sampled data in the first data obtained for every sampling period $1/f_{sc}$ and having the same phase with respect to the chrominance subcarrier of the input composite color video signal within one horizontal scanning period and for producing second data in which all of the n data groups are arranged in series for each horizontal scanning period, first D/A converting means for converting the second data into an analog video signal and for supplying the analog video signal to a transmission medium, second A/D converting means for subjecting the analog video signal received via the transmission medium to an analog-to-digital (A/D) conversion so as to restore the second data, second data converting means for successively extracting sampled data at each sampling point from each of the n data groups within the second data from the second A/D converting means so as to restore the first data, and second D/A converting means for subjecting the first data from the second data converting means to a digital-to-analog (D/A) conversion so as to restore and output the original input composite color video signal. According to the transmission system of the present invention, when the present invention is applied to a VTR, it is unnecessary to provide special color processing circuits in a recording system and a reproducing system of the VTR.

Another object of the present invention is to provide a color video signal transmission system comprising A/D converting means for sampling an input composite color video signal at a sampling frequency $nf_{sc}$ and for producing first data, where n is an integer greater than or equal to two and $f_{sc}$ denotes a chrominance subcarrier frequency of the input composite color video signal, data converting means for converting the first data into n data groups each comprising sampled data in the first data obtained for every sampling period $1/f_{sc}$ and having the same phase with respect to the chrominance subcarrier of the input composite color video signal within one horizontal scanning period and for producing second data in which sampled data in n/2 data groups arranged in series and sampled data in remaining n/2 data groups arranged in series are alternately transmitted for every predetermined time period or for producing second data in which n data consisting of odd numbered sampled data from each data group arranged in series and n data consisting of even numbered sampled data from each data group arranged in series are alternately transmitted for every predetermined time period by carrying out a decimation, where the predetermined time period is one field or two horizontal scanning periods, and D/A converting means for converting the second data into an analog video signal and for supplying the analog video signal to a transmission medium. According to the transmission system of the present invention, it is possible to restore the original input composite color video signal from the analog video signal received via the transmission medium without lack of information by carrying out an interpolation on the data subjected to the decimation.

Still another object of the present invention is to provide a color video signal transmission system comprising first A/D converting means for sampling an input composite color video signal at a sampling frequency $nf_{sc}$ and for producing first data, where n is an integer greater than or equal to two and $f_{sc}$ denotes a chrominance subcarrier frequency of the input composite color video signal, first data converting means for converting the first data into n data groups each comprising sampled data in the first data obtained for every sampling period $1/f_{sc}$ and having the same phase with respect to the chrominance subcarrier of the input composite color video signal within one horizontal scanning period and for producing second data in which sampled data in n/2 data groups arranged in series and sampled data in remaining n/2 data groups arranged in series are alternately transmitted for every predetermined time period or for producing second data in which n data consisting of odd numbered sampled data from each data group arranged in series and n data consisting of even numbered sampled data from each data group arranged in series are alternately transmitted for every predetermined time period by carrying out a decimation, where the predetermined time period is one field or two horizontal scanning periods, first D/A converting means for converting the second data into an analog video signal and for supplying the analog video signal to a transmission medium, second A/D converting means for subjecting the analog video signal received via the transmission medium to an A/D conversion so as to restore the second data, second data converting means for carrying out an interpolation on the n/2 data groups within the second data from the second A/D converting means by use of n/2 data groups within the second data which is obtained from the second A/D converting means the predetermined time period before or for carrying out an interpolation on the n data within the second data from the second A/D converting means by use of n data within the second data which is obtained from the second A/D converting means the predetermined time period before so as to restore the first data, and second D/A converting means for subjecting the first data from the second data converting means to a D/A conversion so as to restore and output the original input composite color video signal.

A further object of the present invention is to provide a color video signal transmission system comprising A/D converting means for sampling an input composite color video signal at a sampling frequency $nf_{sc}$ and for producing first data, where n is an integer greater than or equal to two and $f_{sc}$ denotes a chrominance subcarrier frequency of the input composite color video signal, data converting means for converting the first data into n data groups each comprising sampled data in the first data obtained for every sampling period $1/f_{sc}$ and having the same phase with respect to the chrominance subcarrier of the input composite color video signal within one horizontal scanning period and for producing in parallel second data comprising the n data groups in M channels, where $2 \leq M \leq n$, and D/A converting means for independently converting the second data in the M channels into analog video signals in M channels and for supplying the analog video signals to a transmission medium in M channels simultaneously. According to the transmission system of the present invention, it is possible to reduce the required frequency band for one channel and obtain a wide frequency band as a whole for the composite color video signal.

Still another object of the present invention is to provide a color video signal transmission system comprising first A/D converting means for sampling an input composite color video signal at a sampling frequency $nf_{sc}$ and for producing first data, where n is an integer greater than or equal to two and $f_{sc}$ denotes a chrominance subcarrier frequency of the input composite color video signal, first data converting means for converting the first data into n data groups each comprising sampled data in the first data obtained for every sampling period $1/f_{sc}$ and having the same phase with respect to the chrominance subcarrier of the input composite color video signal within one horizontal scanning period and for producing in parallel second data comprising the n data groups in M channels, where $2 \leq M \leq n$, first D/A converting means for independently converting the second data in the M channels into analog video signals in M channels and for supplying the analog video signals to a transmission medium in M channels simultaneously, second A/D converting means for independently subjecting the analog video signals received via the transmission medium in the M channels to an A/D conversion so as to restore the second data in the M channels, second data converting means for converting the second data in the M channels from the second A/D converting means into the n data groups so as to restore the first data from the n data groups, and second D/A converting means for subjecting the first data from the second data converting means to a D/A conversion so as to restore and output the original input composite color video signal.

Other objects and further features of the present invention will be apparent from the following detailed description when read in conjunction with the accompanying drawings.

BRIEF DESCRIPTION OF THE DRAWINGS

FIG. 1 is a system block diagram showing the basic construction of a signal transmitting system of the color video signal transmission system according to the present invention;

FIG. 2 is a system block diagram showing the basic construction of a signal transmitting and receiving system of the color video signal transmission system according to the present invention;

FIG. 3 is a system block diagram showing a first embodiment of a recording system of a VTR applied with the system according to the present invention;

FIGS. 4(A) through 4(D) are diagrams for explaining the operation of the recording system shown in FIG. 3;

FIG. 5 is a system circuit diagram showing an embodiment of a control circuit within the recording system shown in FIG. 3;

FIG. 6 is a system circuit diagram showing an embodiment of a counter within the control circuit shown in FIG. 5;

FIG. 7 is a system circuit diagram showing an embodiment of another counter within the control circuit shown in FIG. 5;

FIG. 9 shows a recording format on a tape;

FIG. 10 is a system block diagram showing a first embodiment of a reproducing system of the VTR applied with the system according to the present invention;

FIG. 12 is a system circuit diagram showing an embodiment of a control circuit within the reproducing system shown in FIG. 10;

FIG. 13 is a system block diagram showing an essential part of a second embodiment of the recording system of the VTR applied with the system according to the present invention;

FIG. 14 is a system block diagram showing an essential part of a second embodiment of the reproducing system of the VTR applied with the system according to the present invention;

FIGS. 15(A) through 15(C) are diagrams for explaining the operation of the block systems shown in FIGS. 13 and 14;

DETAILED DESCRIPTION

Figure 8:
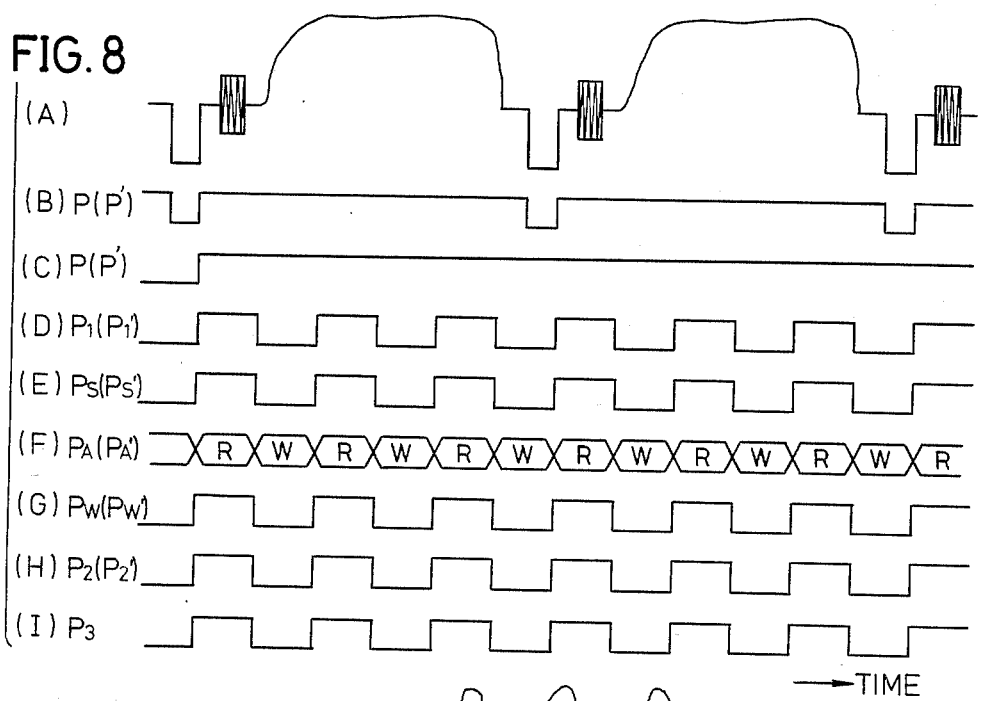
FIGS. 8(A) through 8(I) are timing charts showing the signal waveforms at various parts of the block systems shown in FIGS. 3 and 10.

FIG. 1 shows the basic construction of the signal transmitting system of the color video signal transmission system according to the present invention. The transmitting system comprises an analog-to-digital (A/D) converting means 11, a data converting means 12 and a digital-to-analog (D/A) converting means 13. The A/D converting means 11 produces first data by sampling an input composite color video signal from an input terminal 10 at a sampling frequency $nf_{sc}$, where n is a natural number and $f_{sc}$ denotes a chrominance subcarrier frequency of the input composite color video signal. The data converting means 12 converts the first data into n data groups each comprising sampled data in the first data obtained for every sampling period $1/f_{sc}$ and having the same phase with respect to the chrominance subcarrier of the input composite color video signal within one horizontal scanning period, and produces second data in which all of the n data groups are arranged in series for each horizontal scanning period. The D/A converting means 13 converts the second data into an analog video signal which has the form of a pseudo component coded signal, and supplies the analog video signal to a transmission medium (not shown) via an output terminal 14.

FIG. 2 shows the basic construction of the signal transmitting and receiving system of the color video signal transmission system according to the present invention. In addition to the signal transmitting system comprising the A/D converting means 11, the data converting means 12 and the D/A converting means, the signal receiving system comprises a second A/D converting means 16, a second data converting means 17 and a second D/A converting means 18. The second A/D converting means 16 subjects the output analog video signal of the first D/A converting means 13 received via a transmission medium 15 to an analog-to-digital (A/D) conversion so as to restore the second data. The second data converting means 17 successively extracts sampled data at each sampling point from each of the n data groups within the second data from the second A/D converting means 16 so as to restore the first data. The second D/A converting means 18 subjects the first data from the second data converting means 17 to a digital-to-analog (D/A) conversion so as to restore and output the original input composite color video signal via an output terminal 19.

FIG. 3 shows a first embodiment of the recording system of the VTR applied with the system according to the present invention. In FIG. 3, a composite color video signal shown in FIG. 4(A) is applied to an input terminal 21 and is supplied to an A/D converter 23 and a timing pulse generating circuit 24 via an automatic gain control (AGC) circuit 22. As is well known, the composite color video signal is a band-share-multiplexed signal of a luminance signal and a carrier chrominance signal obtained by quadrature modulation of chrominance subcarriers by two kinds of color difference signals, where the chrominance subcarriers have a chrominance subcarrier frequency $f_{sc}$ of 3.58 MHz in the case of the NTSC system and 4.43 MHz in the case of the PAL system, for example.

The timing pulse generating circuit 24 separates a horizontal synchronizing signal from the composite color video signal and generates a timing pulse P having a period of one horizontal scanning period (1H) by shaping the separated horizontal synchronizing signal. The timing pulse P is supplied to a phase locked loop (PLL) circuit 25 and to a control circuit 26. In addition, the timing pulse generating circuit 24 also separates a vertical synchronizing signal V.SYNC from the composite color video signal and supplies this vertical synchronizing signal V.SYNC to the control circuit 26. The PLL circuit 25 generates a pulse signal P1 having a frequency $3f_{sc}$ ($3f_{sc} \approx 10.7$ MHz in the case of the NTSC system), for example, based on the incoming timing pulse P. The pulse signal P1 is supplied to the control circuit 26.

Based on the pulse signal P1, the control circuit 26 generates a sampling pulse $P_S$ having a frequency $3f_{sc}$, a write-in control signal $P_W$, a read-out control signal $P_R$, and a pulse signal P2. The sampling pulse $P_S$ is supplied to the A/D converter 23, the write-in and read-out control signals $P_W$ and $P_R$ are supplied to a random access memory (RAM) 27, and the pulse signal P2 is supplied to a D/A converter 28. Furthermore, the control circuit 26 generates an address signal $P_A$ based on the pulse signal P1 and the timing pulse P, and this address signal $P_A$ is supplied to the RAM 27.

FIG. 5 shows an embodiment of the control circuit 26. The control circuit 26 comprises a flip-flop 36, counters 37 and 38, and a switching circuit 39. The vertical synchronizing signal V.SYNC from the timing pulse generating circuit 24 is supplied to a reset terminal R of the flip-flop 36 via a terminal $26_1$, and the timing pulse P is supplied to clear terminals CL of the counters 37 and 38 via a terminal $26_2$. On the other hand, the pulse signal P1 from the PLL circuit 25 is applied to a terminal $26_3$ and is supplied to clock terminals of the counters 37 and 38 and to terminals $26_6$ through $26_8$. The pulse signal P1 from the terminal $26_2$ is also supplied to the switching circuit 39 as a switching signal, and the switching circuit 39 selectively supplies to a terminal group $26_5$ a write-in address from the counter 37 or a read-out address from the counter 38 responsive to the switching signal. A Q-output of the flip-flop 36 is supplied to a terminal $26_4$. Accordingly, the address signal $P_A$ is obtained from the terminal $26_4$ and the terminal group $26_5$. In the present embodiment, the address signal $P_A$ is an 11-bit signal comprising bits $A_0$ through $A_{10}$.

FIG. 6 shows an embodiment of the counter 38. The counter 38 comprises a 3-counter 41, a 227-counter 42, an OR gate 43 and an inverter 44. The timing pulse P from the terminal $26_2$ is supplied to one input terminal of the OR gate 43 and to a clear terminal CL of the counter 42. The pulse signal P1 from the terminal $26_3$ is supplied to clock terminals of the counters 41 and 42. A signal from a ripple carry terminal R.C. of the counter 41 is supplied to an enable terminal EN of the counter 42 and to the other input terminal of the OR gate 43. The signal from a ripple carry terminal R.C. of the counter 41 has a high level when the counted value is "2" (that is, the bits $A_1A_0$ are "10" in binary) and otherwise has a low level. A signal from a ripple carry terminal R.C. of the counter 42 is supplied to an enable terminal EN of the counter 41 via the inverter 44. The signal from the ripple carry terminal R.C. of the counter 42 has a high level when the counted value is "226" (that is, the bits $A_9A_8A_7A_6A_5A_4A_3A_2$ are "11100010" in binary) and otherwise has a low level. The bits $A_0$ and $A_1$ from terminals $Q_A$ and $Q_B$ of the counter 41 and the bits $A_2$ through $A_9$ from terminals $Q_A$ through $Q_H$ of the counter 42 are supplied to the switching circuit 39 as the write-in address.

FIG. 7 shows an embodiment of the counter 37. In FIG. 7, those parts which are the same as those corresponding parts in FIG. 6 are designated by the same reference numerals, and description thereof will be omitted. In the counter 37, the connecting positions of the counters 41 and 42 are reversed to those of the counter 38 shown in FIG. 6. The bits $A_0$ and $A_1$ from terminals $Q_A$ and $Q_B$ of the counter 41 and the bits $A_2$ through $A_9$ from terminals $Q_A$ through $Q_H$ of the counter 42 are supplied to the switching circuit 39 as the read-out address.

For example, when storage locations within the RAM 27 are designated by the address signal $P_A$ as shown in the Table, the write-in of data to the RAM 27 (or read-out of data from the RAM 27) is carried out in the sequence of the storage locations 0, 1, 2, 3, 4, ..., 675, 676, and 677 by the operation of the counter 38, and the read-out of data from the RAM 27 (or write-in of data to the RAM 27) is carried out in the sequence of the storage locations 0, 3, 6, 9, ..., 675, 1, 4, 7, 10, ..., 676, 2, 5, 8, 11, ..., and 677 by the operation of the counter 37. Such operations are alternately carried out in the storage regions for the cases where the most significant bit (MSB) $A_{10}$ of the address signal $P_A$ is "0" and "1".

TABLE

| $A_1A_0$ | $A_9A_8A_7A_6$ 0000 / $A_5A_4A_3A_2$ 0000 | 0000 / 0001 | 0000 / 0010 | 0000 / 0011 | ... 1110 / 0001 |
|---|---|---|---|---|---|
| 00 | 0 | 3 | 6 | 9 | 675 |
| 01 | 1 | 4 | 7 | 10 | 676 |
| 10 | 2 | 5 | 8 | 11 | 677 |
| 11 | — | — | — | — | — |

When using a generally available RAM for the RAM 27, the storage locations where the lower two bits $A_1$ and $A_0$ of the address signal $P_A$ are "11" are not used. In this case, approximately ¼ of the total storage region remains unused and the utilization efficiency of the RAM is poor, but it is possible to use a control circuit having a simple circuit construction. However, it is evident that the memory capacity of the RAM can be fully utilized when the address signal has $2^m$ bits, where m is a natural number.

FIGS. 8(A) through 8(H) are timing charts showing the signal waveforms at various parts of the recording system shown in FIG. 3. FIG. 8(A) shows the composite color video signal applied to the input terminal 21, and FIG. 8(B) shows the timing pulse P. FIG. 8(C) shows the timing pulse P on an expanded time base compared to FIG. 8(B). FIGS. 8(D) through 8(H) respectively show the sampling pulse $P_S$, the address signal $P_A$, the write-in control signal $P_W$ and the pulse signal P2 in correspondence with FIG. 8(C). In FIG. 8(F), the write-in address is denoted by "W" and the read-out address is denoted by "R".

The A/D converter 23 samples the composite color video signal with the sampling pulse $P_S$ having the sampling frequency $3f_{sc}$ and produces digital data having a quantization number of seven or eight bits for one sampling point, for example. FIG. 4(B) shows the relationship between the chrominance subcarrier and the sampling points, and circular marks on the chrominance subcarrier indicate the sampling points. In FIG. 4(B), since the sampling frequency is three times the chrominance subcarrier frequency $f_{sc}$, three kinds of sampling points having mutually different phases with respect to the chrominance subcarrier exist in one period of the chrominance subcarrier. Sampled data at the three kinds of sampling points will be denoted by a1, b1 and c1 (and a2, b2, c2 and the like). Hence, the A/D converter 23 supplies to the RAM 27 digital data in which the sampled data a1, b1, c1, a2, b2, c2, ... having the quantization number of seven or eight bits are transmitted in time-sequence.

The RAM 27 has a memory capacity for storing data amounting to a minimum of 2H, and is used to rearrange the digital data from the A/D converter 23. The digital data from the A/D converter 23 is written into predetermined addresses of the RAM 27 responsive to the address signal $P_A$ and the write-in control signal $P_W$, and the sampled data in the digital data are grouped into data groups each amounting to 1H, comprising sampled data obtained with a sampling period $1/f_{sc}$ and having the same phase with respect to the chrominance subcarrier of the composite color video signal. In other words, the sampled data in the digital data are grouped into a data group a comprising the sampled data a1, a2, a3, ..., a data group b comprising the sampled data b1, b2, b3, ..., and a data group c comprising the sampled data c1, c2, c3, ... Next, the data groups a, b and c are arranged in series in this sequence as shown in FIG. 4(C) and are read out from the RAM 27 responsive to the read-out control signal $P_R$. The read out digital data from the RAM 27 are supplied to the D/A converter 28.

The D/A converter 28 converts the digital data from the RAM 27 into an analog video signal in which the time base is compressed by $\frac{1}{3}$ and the three data groups (color video signals) a, b and c are arranged as shown in FIG. 4(D) within 1H. The output analog video signal of the D/A converter 28 is passed through an emphasis circuit 29 and is supplied to a frequency modulator 30.

The frequency modulator 30 frequency-modulates the analog video signal from the emphasis circuit 29 and supplies a frequency modulated (FM) analog video signal to a recording amplifier 31. The recording amplifier 31 supplies the FM analog video signal to rotary heads H1 and H2 which are mounted at diametrical positions on a rotary drum (not shown), and the rotary heads H1 and H2 alternately record the FM analog video signal on a magnetic tape T.

For example, in the case where the composite color video signal is in conformance with the NTSC system, a frequency band of 5.4 MHz ($\approx 3f_{sc}/2$) or over is required to transmit the analog video signal, and the VTR must be capable of sufficiently passing signals in such a frequency band when recording and reproducing the analog video signal on and from the magnetic tape on the VTR.

A frequency band of approximately 6 MHz and $-3$ dB is used in the VTR for the video signal in the case of the NTSC system, but it is necessary to pass carriers in the order of 8 MHz to 9 MHz when recording and reproducing the FM analog video signal. For this reason, it is necessary to increase the relative speed between the tape and the head and double the rotational speed of the rotary drum, for example. As a result, the recording format on the magnetic tape becomes such that the composite color video signal amounting to one field is recorded on two tracks.

FIG. 9 shows a recording format on the magnetic tape T when the color video signal transmission system according to the present invention is applied to the VTR. In FIG. 9, t1 through t4 denote center lines of tracks formed on the magnetic tape T, and a track pitch between the center lines of two mutually adjacent tracks is set to 19 $\mu$m, for example. The 0H to 131.25H of the FM analog video signal are recorded on the track having the center line t1, and the 131.25H to 262.5H of the FM analog video signal are recorded on the track having the center line t2. The 262.5H to 393.75H of the FM analog video signal are recorded on the track having the center line t3, and the 393.75H to 525H of the FM analog video signal are recorded on the track having the center line t4. In other words, the composite color video signal amounting to one frame is divisionally recorded on the four tracks having the center lines t1 through t4.

Accordingly, in the VTR applied with the present invention, a switching takes place within the picture because the composite color video signal amounting to one frame is recorded on four tracks. It is difficult to process the signals which are recorded or reproduced at the instant when the scanning position of the head changes from one track to another track, and it is undesirable to record the composite color video signal amounting to one frame on four tracks. However, since the VTR applied with the present invention records and reproduces the composite color video signal in the form of a pseudo component coded signal, it is sufficient to simply process the signals which are reproduced at the instant when the scanning position of the head changes from one track to another track so that a skew (that is, a phase error between signals reproduced from two mutually adjacent tracks) becomes inconspicuous on the reproduced picture. Thus, compared to the conventional VTR, the load on a time base corrector becomes reduced according to the VTR applied with the present invention.

In order to satisfy the condition of the so-called H-alignment between two mutually adjacent tracks when the rotational speed of the rotary drum is doubled, that is, in order for the recorded positions of the horizontal synchronizing signals to be aligned between two mutually adjacent tracks when the rotational speed of the rotary drum is doubled, a starting position (and a terminal position) of one track and a starting position (and a terminal position) of a next track must be deviated by an odd number multiple of 0.75H in a longitudinal direction of the track. However, when the rotational speed of the rotary drum is doubled and the starting position of one track and the starting position of the next track are deviated by 0.75H in the longitudinal direction of the track, the magnetic tape must be transported at a speed which is two times the speed in a normal mode and it is impossible to carry out the recording and reproduction for a long period of time. Hence, in FIG. 9, the starting position of one track and the starting position of the next track are deviated by 0.25H in the longitudinal direction of the track. According to the recording format shown in FIG. 9, there is no H-alignment between two mutually adjacent tracks, but there is H-alignment between every other tracks.

As a result, when rotary heads having gaps of mutually different azimuth angles are used for the rotary heads H1 and H2, it becomes possible to carry out a high-speed search. In addition, the rotary heads H1 and H2 scan along a scanning locus ts during a still reproduction mode, and a still picture is obtainable from the two tracks by reproducing signals amounting to one field. There is no discontinuity in the horizontal synchronizing signals and it is possible to obtain a satisfactory still picture in the still reproduction mode.

The crosstalk interference from the adjacent track may be reduced by using the so-called FM interleaving effect. However, the effects of the crosstalk interference is different for the case where the H-alignment exists and for the case where the H-alignment does not exist in the recording format on the magnetic tape T. In the case shown in FIG. 9 where the starting position of one track and the starting position of the next track are deviated by 0.25H in the longitudinal direction of the track, a ghost of the synchronizing signal portion reproduced from the adjacent track appears at the center part of the reproduced picture. When such a ghost is conspicuous in the reproduced picture, the signals reproduced from every other track on the magnetic tape T may be delayed by 0.5H so as to make the ghost less conspicuous. Such a delay of 0.5H can be provided with ease in the VTR applied with the present invention. In addition, it is possible make the ghost inconspicuous by employing a frequency modulation in which the carrier at the synchronizing signal part is set to the carrier with the higher frequency.

Next, description will be given with respect to a first embodiment of the reproducing system of the VTR applied with the present invention, by referring to FIG. 10. The FM analog video signal reproduced from the magnetic tape T by the rotary heads H1 and H2 are passed through respective pre-amplifiers 50 and 51 and are supplied to a switching circuit 52. The switching circuit 52 alternately passes the reproduced signals from the pre-amplifiers 50 and 51 responsive to a switching signal which is obtained via a terminal 53 and has a period dependent on the track scanning times of the rotary heads H1 and H2. In other words, a continuous reproduced FM analog video signal is produced from the switching circuit 52 and is supplied to a frequency demodulator 55 and a dropout detector 56 via an equalizer circuit 54.

Figure 11:
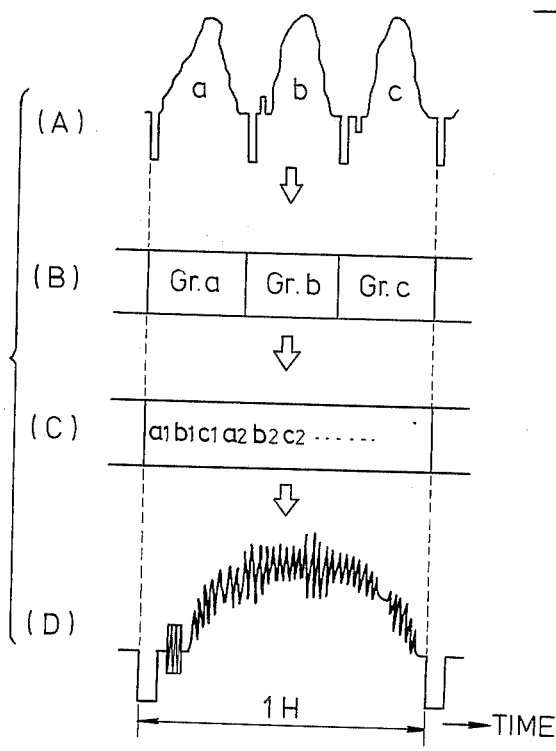
FIGS. 11(A) through 11(D) are diagrams for explaining the operation of the reproducing system shown in FIG. 10.

The frequency demodulator 55 frequency-demodulates the reproduced FM analog video signal into a reproduced analog video signal shown in FIG. 11(A), and this reproduced analog video signal is supplied to an A/D converter 57 and to a timing pulse generating circuit 58. The timing pulse generating circuit 58 separates the horizontal synchronizing signal from the reproduced analog video signal and generates a timing pulse P' by shaping the separated horizontal synchronizing signal. The timing pulse P' is supplied to a PLL circuit 59 and to a control circuit 60. In addition, the timing pulse generating circuit 58 separates the vertical synchronizing signal V.SYNC' from the reproduced analog video signal and supplies the separated vertical synchronizing signal V.SYNC' to the control circuit 60. The PLL circuit 59 generates a pulse signal P1' having a frequency $3f_{sc}$ based on the timing pulse P' and supplies the pulse signal P1' to the control circuit 60. On the other hand, a clock circuit 62 having a crystal vibrator 61 generates a reference clock signal P3 having a frequency $3f_{sc}$ and supplies this reference clock signal P3 to the control circuit 60.

Based on the pulse signal P1', the control circuit 60 generates a sampling pulse $P_S'$ and a write-in control signal $P_W'$ which are supplied to the A/D converter 57 and a RAM 63, respectively. Furthermore, the control circuit 60 generates an address signal $P_A'$ based on the pulse signal P1' and the timing pulse P', and this address signal $P_A'$ is supplied to the RAM 63. The control circuit 60 also generates a read-out control signal $P_R'$ and a pulse signal P2' based on the reference clock signal P3, and the read-out control signal $P_R'$ and the pulse signal P2' are supplied to the RAM 63 and a D/A converter 64, respectively.

A time base deviation (jitter) is included in the output signal of the frequency demodulator 55, and the jitter is accordingly included in the output pulse signal P1' of the PLL circuit 59. Thus, the sampling pulse $P_S'$, the write-in control signal $P_W'$ and the address signal $P_A'$ generated by the control circuit 60 similarly include the jitter. For this reason, the RAM 63 and the A/D converter 57 process the signals all including the jitter, and the signal processings in the RAM 63 and the A/D converter 57 are thus unaffected by the jitter. After the signals including the jitter are processed in the RAM 63 and the A/D converter 57, digital data are read out from the RAM 63 responsive to the read-out control signal $P_R'$ and the read out digital data are converted into the original composite color video signal in the D/A converter 64 responsive to the pulse signal P2'. Since the read-out control signal $P_R'$ and the pulse signal P2' are generated based on the reference clock signal P3 which includes no jitter, the signal processings responsive to the read-out control signal $P_R'$ and the pulse signal P2' result in a jitter compensation and the original composite color video signal obtained from the D/A converter 64 includes no jitter.

The A/D converter 57 samples the reproduced signal shown in FIG. 11(A) by the sampling pulse $P_S'$ and produces a digital data shown in FIG. 11(B) having a quantization number of seven or eight bits for one sampling point, for example. The data groups a, b and c are arranged in series in this sequence in the digital data from the A/D converter 57, and this digital data is supplied to the RAM 63.

The RAM 63 has a memory capacity for storing data amounting to a minimum of 2H, and is used to rearrange the digital data from the A/D converter 57. The digital data from the A/D converter 57 is written into predetermined addresses of the RAM 63 responsive to the address signal $P_A'$ and the write-in control signal $P_W'$, and sampled data in each data group of the digital data are extracted sequentially so as to produce a digital data shown in FIG. 11(C) in which the sampled data a1, b1, c1, a2, b2, c2, . . . are transmitted in time-sequence responsive to the read-out control signal $P_R'$. The digital data read out from the RAM 63 responsive to the read-out control signal $P_R'$ are supplied to the D/A converter 64 and are converted into the original composite color video signal shown in FIG. 11(D) responsive to the pulse signal P2' and is outputted via an output terminal 65.

On the other hand, the dropout detector 56 generates a dropout detection signal when a dropout is detected in the reproduced signal from the equalizer circuit 54, and this dropout detection signal is supplied to the control circuit 60. When the dropout detection signal is received, the control circuit 60 controls the RAM 63 so as to read out the digital data which are related to the horizontal scanning period of 2H before the present horizontal scanning period and have the same chrominance subcarrier phase as the present horizontal scanning period. In this case, the D/A converter 64 subjects the digital data related to the horizontal scanning period of 2H before to a D/A conversion and supplies a resulting composite color video signal to the output terminal 65 as the composite color video signal related to the present horizontal scanning period.

FIG. 12 shows an embodiment of the control circuit 60. The control circuit 60 comprises a flip-flop 66, counters 67 and 68, and a switching circuit 69. The vertical synchronizing signal V.SYNC' from the timing pulse generating circuit 58 is supplied to a reset terminal R of the flip-flop 66 via a terminal $60_1$, and the timing pulse P' is supplied to clear terminals CL of the counters 67 and 68 via a terminal $60_2$. On the other hand, the pulse signal P1' from the PLL circuit 59 is applied to a terminal $60_3$ and is supplied to a clock terminal of the counter 67 and to terminals $60_6$ and $60_7$. The reference clock signal P3 from the clock circuit 62 is applied to a terminal $60_9$ and is supplied to a clock terminal of the counter 68 and to a terminal $60_8$. The pulse signal P1' from the terminal $60_3$ is also supplied to the switching circuit 69 as a switching signal, and the switching circuit 69 selectively supplies to a terminal group $60_5$ a write-in address from the counter 67 or a read-out address from the counter 68 responsive to the switching signal. A Q-output of the flip-flop 66 is supplied to a terminal $60_4$. Accordingly, the address signal $P_A'$ is obtained from the terminal $60_4$ and the terminal group $60_5$. In the present embodiment, the address signal $P_A'$ is an 11-bit signal comprising bits $A_0$ through $A_{10}$. The dropout detection signal from the dropout detector 56 is passed through terminals $60_{10}$ and $60_{11}$ and is supplied to a write inhibit terminal of the RAM 63.

The counters 67 and 68 have constructions similar to those of the counters 37 and 38 shown in FIGS. 7 and 6, and for this reason, the illustration and description thereof will be omitted.

The reproduced composite color video signal from the output terminal 65 and the timing pulse P' from the timing pulse generating circuit 58 have waveforms similar to those shown in FIGS. 8(A) and 8(B), respectively. The timing pulse P', the output pulse signal P1' of the PLL circuit 59, the sampling pulse $P_S'$, the address signal $P_A'$, the write-in control signal $P_W'$ and the pulse signal P2' have waveforms similar to those shown in FIGS. 8(C) through 8(H), respectively. In addition, the reference clock signal P3 has a waveform shown in FIG. 8(I).

According to the present embodiment, the sampled data of the composite color video signal having the same phase with respect to the chrominance subcarrier are grouped for each horizontal scanning period, so as to transmit the composite color video signal in the form of a pseudo component coded signal. Hence, it is possible to eliminate the problems of the conventional composite color video signal transmission system, and the following advantages are obtainable when the present invention is applied to the VTR.

Firstly, although the frequency band of the luminance signal is generally 4.2 MHz, the transmitting frequency band of the video signal in the system according to the present invention is 5.4 MHz for the NTSC system, and it is hence possible to completely restore the original luminance signal at the time of the reproduction in the VTR applied with the present invention.

Secondly, the present invention is especially suited for FM signal transmission because the chrominance subcarrier component having a large energy in the high frequency range will not be transmitted as it is but only after being subjected to the digital signal processing in the recording system.

Thirdly, it is possible to carry out a jitter compensation and stably transmit the color video signal.

Fourthly, the VTR applied with the present invention requires no special color processing circuits in the recording system nor the reproducing system thereof.

Fifthly, it is possible to apply the present invention to the VTR which forms tracks on the magnetic tape without a guard band between two successive tracks by simply using a pair of rotary heads having gaps of mutually different azimuth angles, because the composite color video signal is not separated into the luminance signal and the carrier chrominance signal at the time of the recording.

Sixthly, no waveform distortion is generated because the composite color video signal is processed digitally before being transmitted.

Seventhly, it is possible to obtain a high resolution (for example, it is possible to obtain 430 scanning lines in the case of the NTSC system) because the composite color video signal is not separated into the luminance signal and the carrier chrominance signal.

The signal processing in the present embodiment may be carried out by use of charge coupled devices (CCDs) instead of using digital circuits. Furthermore, since the sampling points having the same phase with respect to the chrominance subcarrier have a regularity also in the PAL system, the present embodiment may be applied to the transmission of the PAL system composite color video signal by appropriately varying parameters of the present embodiment.

FIG. 13 shows an essential part of a second embodiment of the recording system of the VTR applied with the system according to the present invention. In FIG. 13, those parts which are the same as those corresponding parts in FIG. 3 are designated by the same reference numerals, and description thereof will be omitted. The composite color video signal applied to the input terminal 21 is passed through the AGC circuit 22 and is supplied to the timing pulse generating circuit 24, a synchronizing signal separating circuit 71 and a switching circuit 72. The synchronizing signal separating circuit 71 separates the vertical synchronizing signal V.SYNC from the composite color video signal and controls the switching circuit 72 by the separated vertical synchronizing signal V.SYNC so that only a video information portion of the composite color video signal excluding horizontal and vertical synchronizing signal portions of the composite color video signal is supplied to the A/D converter 23. Hence, only the video signal portion of the composite color video signal excluding the horizontal and vertical synchronizing signal portions is subjected to the signal processing of the system according to the present invention.

FIG. 14 shows an essential part of a second embodiment of the reproducing system of the VTR applied with the system according to the present invention. In FIG. 14, those parts which are the same as those corresponding parts in FIG. 10 are designated by the same reference numerals, and description thereof will be omitted. The vertical synchronizing signal V.SYNC' from the timing pulse generating circuit 58 is supplied to a synchronizing signal generating circuit 74 and to a switching circuit 75. The synchronizing signal generating circuit 74 generates a composite synchronizing signal responsive to the vertical synchronizing signal V.SYNC'. The switching circuit is supplied with the output composite synchronizing signal of the synchronizing signal generating circuit 74 and the output video information portion of the D/A converter 64 excluding the horizontal and vertical synchronizing signal portions. The switching circuit 75 mixes the composite synchronizing signal and the video information portion responsive to the vertical synchronizing signal V.SYNC' from the timing pulse generating circuit 58, and supplies the original composite color video signal to the output terminal 65.

According to the embodiment shown in FIGS. 13 and 14, the signal processing described before in conjunction with the first embodiment is carried out with respect to only the video information portion of the composite color video signal shown in FIG. 15(A) excluding the horizontal and vertical synchronizing signal portions, so as to transmit data groups A, B and C. When the transmitted data groups A, B and C without the horizontal and vertical synchronizing signal portions are received, the horizontal synchronizing signal portion is added as shown in FIG. 15(B) to produce the original composite color video signal amounting to 1H, and the vertical synchronizing signal portion is added as shown in FIG. 15(C) to produce the original composite color video signal amounting to one vertical scanning period (1V).

It is also possible to carry out the signal processing of the present invention only with respect to the video information portion excluding the horizontal or vertical synchronizing signal portion.

According to the second embodiment, the following advantages are obtainable. Firstly, it is easy to discriminate and identify 1H because the data groups A, B and C correspond to the video information portion amounting to 1H excluding the synchronizing signal portion. Secondly, it is possible to reduce the memory capacity which is required to carry out the digital signal processing because the horizontal and/or vertical synchronizing signal portions are not transmitted. Thirdly, there is no loss of information with regard to the horizontal and/or vertical synchronizing signals because the horizontal and/or vertical synchronizing signals are not subjected to the digital signal processing nor transmitted.

But according to the first and second embodiments described heretofore, the frequency band required for the signal transmission in the transmission medium (VTR and the like) is widened to n/2 times the chrominance subcarrier frequency $f_{sc}$ because the composite color video signal is sampled at the sampling frequency $nf_{sc}$.

Accordingly, description will now be given with respect to a third embodiment in which this problem of widened frequency band is eliminated. According to the third embodiment, the composite color video signal is sampled and two kinds of data groups are alternately transmitted for every one field or two horizontal scanning periods (2H) as a pseudo component coded signal. In other words, the sampled data are subjected to a decimation and transmitted. When the pseudo component coded signal is received via a transmission medium, an interpolation is carried out by use of the sampled data in the pseudo component coded signal of one field or 2H before the present pseudo component coded signal so as to restore the original composite color video signal.

According to the present embodiment, the data converting means 12 shown in FIGS. 1 and 2 comprises a decimation means. The data converting means 12 converts the first data from the A/D converting means 11 into n data groups each comprising sampled data in the first data obtained for every sampling period $1/f_{sc}$ and having the same phase with respect to the chrominance subcarrier of the input composite color video signal within one horizontal scanning period and produces second data in which sampled data in n/2 data groups arranged in series and sampled data in remaining n/2 data groups arranged in series are alternately transmitted for every predetermined time period or produces second data in which n data consisting of odd numbered sampled data from each data group arranged in series and n data consisting of even numbered sampled data from each data group arranged in series are alternately transmitted for every predetermined time period by carrying out a decimation, where the predetermined time period is one field or 2H. The D/A converting means 13 converts the second data into an analog video signal and supplies the analog video signal to the transmission medium 15.

On the other hand, the second data converting means 17 comprises an interpolation means. The second data converting means 17 carries out an interpolation on the n/2 data groups within the second data from the second A/D converting means 16 by use of n/2 data groups within the second data obtained from the second A/D converting means 16 the predetermined time period before or carries out an interpolation on the n data within the second data from the second A/D converting means 16 by use of n data within the second data obtained from the second A/D converting means 16 the predetermined time period before, so as to restore the first data. The second D/A converting means 18 subjects the first data from the second data converting means 17 to a D/A conversion so as to restore and output the original input composite color video signal.

In other words, the D/A converting means 13 supplies to the transmission medium 15 the analog video signal which has been subjected to the decimation in the data converting means 12, and this analog video signal contains information which is decimated to ½ that of the original input composite color video signal. As a result, the frequency band required for the signal transmission in the transmission medium 15 can be reduced to approximately n/4 times the chrominance subcarrier frequency $f_{sc}$. On the other hand, the second data converting means 17 carries out the interpolation, that is, a data conversion complementary to the decimation carried out in the first data converting means 12.

According to the third embodiment of the recording system and the reproducing system of the VTR applied with the system according to the present invention, the block systems are identical to those shown in FIGS. 3 and 10, respectively. Accordingly, description on the operations which are the same as those of the first embodiment will be omitted. In the recording system of the present embodiment, the PLL circuit 25 generates a pulse signal P1 having a frequency $4f_{sc}$ ($4f_{sc} \approx 14.32$ MHz in the case of the NTSC system), for example, based on the timing pulse P. The pulse signal P1 is supplied to the control circuit 26, and the control circuit 26 generates a sampling pulse $P_S$ having a frequency $4f_{sc}$ based on the pulse signal P1. The sampling pulse PS is supplied to the A/D converter 23.

Figure 16:
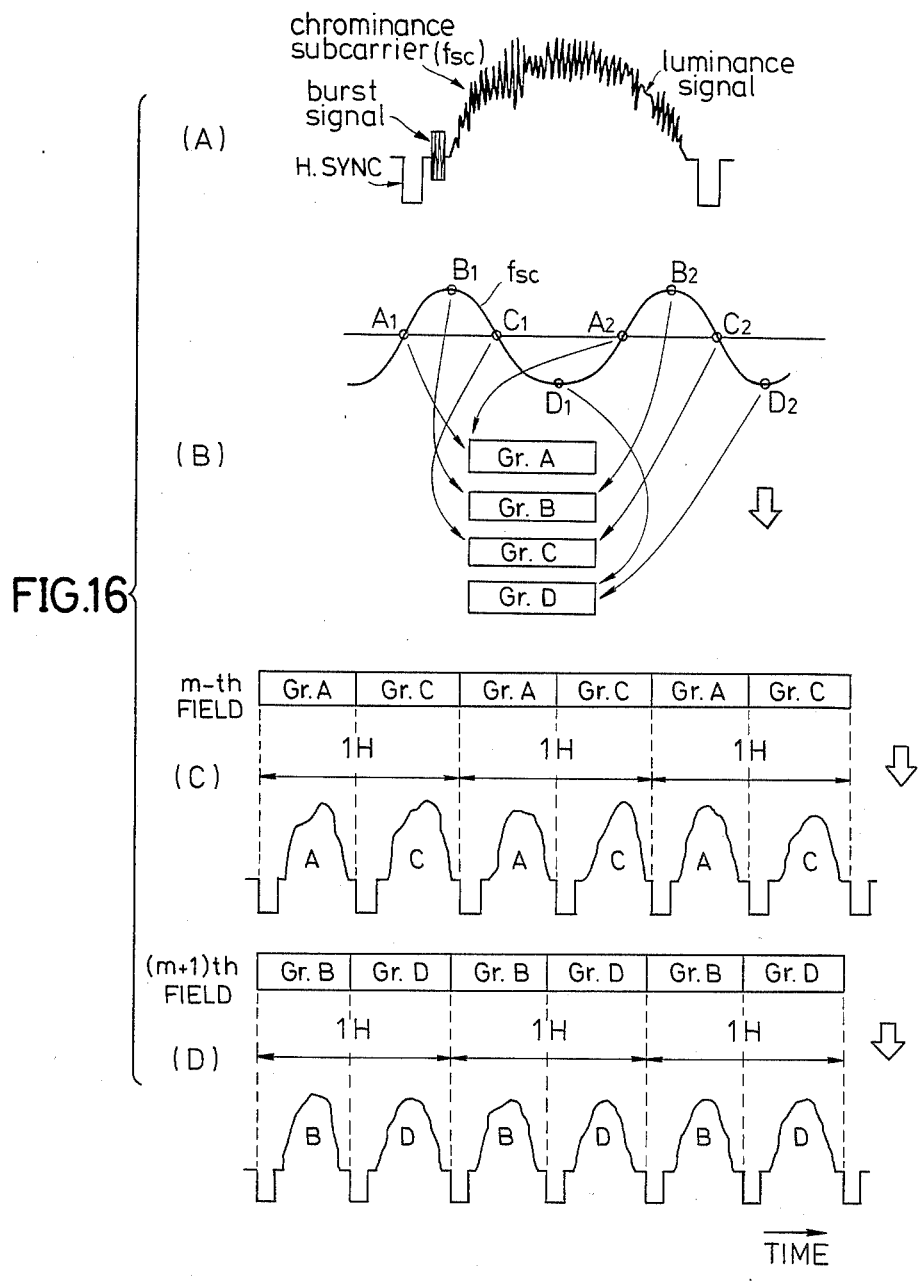
FIGS. 16(A) through 16(D) are diagrams for explaining the operation of a third embodiment of the recording system of the VTR applied with the system according to the present invention.

The A/D converter 23 samples the composite color video signal shown in FIG. 16(B) with the sampling pulse $P_S$ having the sampling frequency $4f_{sc}$ and produces digital data having a quantization number of seven or eight bits. for one sampling point, for example. FIG. 16(B) shows the relationship between the chrominance subcarrier and the sampling points, and circular marks on the chrominance subcarrier indicate the sampling points. In FIG. 16(B), since the sampling frequency is four times the chrominance subcarrier frequency $f_{sc}$, four kinds of sampling points having mutually different phases with respect to the chrominance subcarrier exist in one period of the chrominance subcarrier. Sampled data at the four kinds of sampling points will be denoted by A1, B1, C1 and D1 (and A2, B2, C2, D2 and the like). Hence, the A/D converter 23 supplies to the RAM 27 digital data in which the sampled data A1, B1, C1, D1, A2, B2, C2, D2, . . . having the quantization number of seven or eight bits are transmitted in time-sequence.

The RAM 27 has a memory capacity for storing data amounting to a minimum of 2H, and is used to re-arrange the digital data from the A/D converter 23. The digital data from the A/D converter 23 is written into predetermined addresses of the RAM 27 responsive to the address signal $P_A$ and the write-in control signal $P_W$, and the sampled data in the digital data are grouped into data groups each amounting to 1H, comprising sampled data obtained with a sampling period $1/f_{sc}$ and having the same phase with respect to the chrominance subcarrier of the composite color video signal. In other words, sampled data in the digital data are grouped into a data group A comprising the sampled data A1, A2, A3, . . . , a data group B comprising the sampled data B1, B2, B3, . . . , a data group C comprising the sampled data C1, C2, C3, . . . , and a data group D comprising the sampled data D1, D2, D3, . . . Next, in an m-th field, for example, a digital data consisting only of the sampled data in the data groups A and C and amounting to 1H as shown in FIG. 16(C) is read out from the RAM 27 responsive to the read-out control signal $P_R$, by decimating the sampled data in the data groups B and D. On the other hand, in a (m+1)th field, a digital data consisting only of the sampled data in the data groups B and C and amounting to 1H as shown in FIG. 16(D) is read out from the RAM 27 responsive to the read-out control signal $P_R$, by decimating the sampled data in the data groups A and C.

Accordingly, the digital data are read out from the RAM 27 responsive to the read-out control signal $P_R$ so that a digital data consisting of the sampled data in first data groups and a digital data consisting of the sampled data in second data groups different from the first data groups are alternately supplied to the D/A converter 28.

According to the description given heretofore, the decimation is carried out by controlling the read-out timing, but it is of course possible to carry out the decimation by controlling the write-in timing. In this case, out of the sampled data A1, B1, C1, D1, A2, B2, C2, D2, . . . from the A/D converter 23, the sampled data A1, C1, A2, C2, . . . are written into the RAM 27 in the m-th field responsive to the write-in control signal $P_W$ and the address signal $P_A$ by decimating the sampled data B1, D1, B2, D2, . . . On the other hand, the sampled data B1, D1, B2, D2, . . . are written into the RAM 27 in the (m+1)th field responsive to the write-in control signal $P_W$ and the address signal $P_A$ by decimating the sampled data A1, C1, A2, C2, . . . Then, the sampled data having the same phase with respect to the chrominance subcarrier are grouped together so as to produce the data groups A and C in the m-th field and to produce the data groups B and D in the (m+1)th field, and the sampled data in the data groups A and C and the sampled data in the data groups B and D are alternately read out from the RAM 27 for every one field responsive to the read-out control signal $P_R$.

The D/A converter 28 subjects the digital data from the RAM 27 to a D/A conversion responsive to the pulse signal P2. Hence, the D/A converter 28 produces an analog video signal in which the sampled data in the data groups A and C are arranged within 1H as shown in FIG. 16(C) in the m-th field and produces an analog video signal in which the sampled data in the data groups B and D are arranged within 1H as shown in FIG. 16(D) in the (m+1)th field. Such an analog video signal in which the data groups A and C are arranged within 1H and an analog video signal in which the data groups B and D are arranged within 1H are alternately supplied to the frequency modulator via the emphasis circuit for every one field.

As a result, the composite color video signal is transmitted as a pseudo component coded signal having no chrominance subcarrier. This pseudo component coded signal is uneasily affected by the jitter, generates virtually no waveform distortion, and is suited for transmission in the form of FM signals.

For example, in the case of the NTSC system, the frequency band required to transmit the analog video signal is 3.58 MHz ($=4f_{sc}/2 \times \frac{1}{2} = f_{sc}$) and is $\frac{1}{2}$ the frequency band ($4f_{sc}/2 = 2f_{sc} = 7.16$ MHz) which is required to transmit the analog video signal when the decimation described before is not carried out.

Next, description will be given with respect to the operation of the third embodiment of the reproducing system by referring to FIGS. 10 and 17(A) through 17(E). In FIG. 10, the PLL circuit 59 generates a pulse signal P1' having a frequency $4f_{sc}$ based on the timing pulse P', and supplies the pulse signal P1' to the control circuit 60. On the other hand, the clock circuit 62 having the crystal vibrator 61 supplies to the control circuit 60 a reference clock signal P3 having a frequency $4f_{sc}$.

Figure 17:
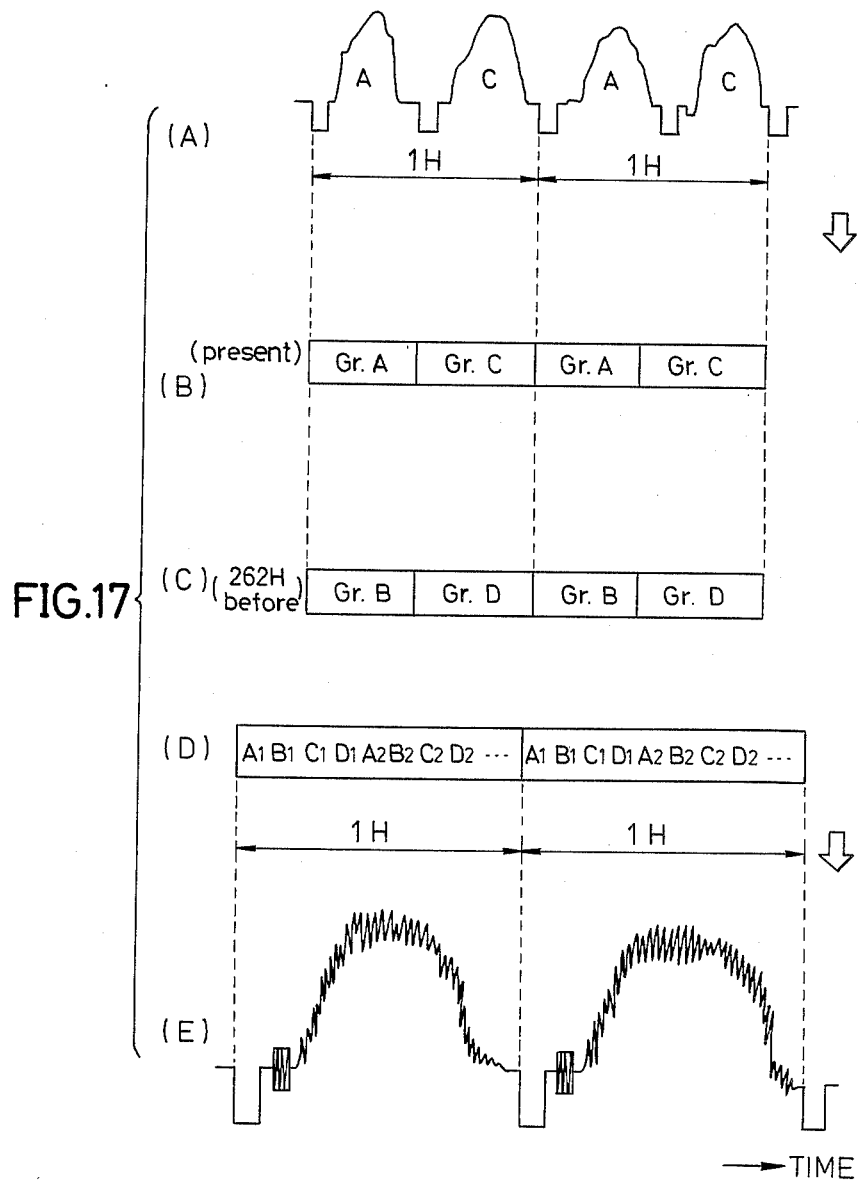
FIGS. 17(A) through 17(E) are diagrams for explaining the operation of a third embodiment of the reproducing system of the VTR applied with the system according to the present invention.

In the m-th field, for example, the A/D converter 57 samples a reproduced signal shown in FIG. 17(A) by the sampling pulse $P_S'$ and supplies to the RAM 63 a digital data shown in FIG. 17(B) having a quantization number of seven or eight bits for one sampling point, for example. This digital data supplied to the RAM 63 includes the sampled data in the data groups A and C within 1H.

The RAM 63 needs to have a memory capacity for storing data amounting to a minimum of one field. The RAM 63 writes the incoming digital data at predetermined addresses responsive to the write-in control signal $P_W'$ and the address signal $P_A'$. Next, the present digital data comprising the data groups A and C such as that shown in FIG. 17(B) and the digital data comprising the data groups B and D of one field (262H) before such as that shown in FIG. 17(C) are read out from the RAM 63 responsive to the read-out control signal $P_R'$, by extracting the sampled data from each of the data groups A, B, C and D and re-arranging the read out sampled data in the sequence of the sampled data A1, B1, C1, D1, A2, B2, C2, D2, . . . as shown in FIG. 17(D). The read out digital data from the RAM 63 is subjected to a D/A conversion in the D/A converter 64 responsive to the pulse signal P2' so as to restore the original input composite color video signal shown in FIG. 17(E), and this composite color video signal is outputted via the output terminal 65.

In this case, the position of the present scanning line in the picture and the position of the scanning line of one field before in the picture are approximately the same, and the level of the composite color video signal at these two scanning lines may be assumed to be the same because the information on these two scanning lines are virtually the same. Accordingly, as described before, it is possible to substantially and fully restore the original composite color video signal by carrying out the interpolation by use of the data on the present scanning line and the data on the scanning line of one field before.

According to the present embodiment, the frequency band required for the signal transmission in the VTR may be in the order of 3.58 MHz, but the frequency band of the composite color video signal obtained via the output terminal 65 becomes 7.16 MHz (resolution of 570 lines).

The signal processing in the present embodiment may be carried out by use of CCDs instead of using digital circuits. Furthermore, since the sampling points having the same phase with respect to the chrominance subcarrier have a regularity also in the PAL system, the present embodiment may be applied to the transmission of the PAL system composite color video signal by appropriately varying parameters of the present embodiment.

In the present embodiment, the digital data are decimated for every one field in the signal transmitting system and the interpolation is carried out thereafter in the signal receiving system by use of the present digital data and the digital data of one field before. However, the digital data may be decimated for every 2H in the signal transmitting system and the interpolation may be carried out thereafter in the signal receiving system by use of the present digital data and the digital data of 2H before. In this case, the phase of the subcarrier is the same on the present scanning line and the scanning line of 2H before, and the signal levels are approximately the same between these two scanning lines. Hence, it is also possible in this case to substantially and fully restore the original composite color video signal.

The sampling frequency is not limited to $4f_{sc}$, and may be selected to n times the chrominance subcarrier frequency $f_{sc}$, where n is an integer greater than or equal to two. Moreover, the method of decimating the sampled data is not limited to that shown in FIG. 16.

Brief description will be given with respect to the decimation of the sampled data in the RAM 27 for the case where the sampling frequency is selected to $3f_{sc}$. In this case, the sampled data obtained by sampling the composite color video signal in the A/D converter 23 at the sampling frequency $3f_{sc}$ are supplied to the RAM 27 in the sequence of the sampled data aa1, bb1, cc1, ..., aa4, bb4, cc4, ... The RAM 27 produces data groups aa, bb and cc each comprising the sampled data having the same phase with respect to the chrominance subcarrier. The data group aa comprises sampled data aa1, aa2, aa3, aa4, ..., the data group bb comprises sampled data bb1, bb2, bb3, bb4, ..., and the data group cc comprises sampled data cc1, cc2, cc3, cc4, ... For example, in the m-th field, all of the sampled data in the data group aa and ½ of the sampled data in the data group cc are transmitted, and all of the sampled data in the data group cc and the remaining ½ of the sampled data in the data group cc are transmitted in the (m+1)th field.

As another method of decimation, it is possible to transmit only the odd numbered sampled data aa1, cc1, bb2, aa3, cc3, bb4, ... out of the output sampled data of the A/D converter 23 in the m-th field by decimating the even numbered sampled data, so as to produce a data group comprising the sampled data aa1, aa3, ..., a data group comprising the sampled data bb2, bb4, ... , and a data group comprising the sampled data cc1, cc3, ... In this case, only the even numbered sampled data are transmitted in the (m+1)th field by decimating the odd numbered sampled data, so as to produce a data group comprising the sampled data aa2, aa4, ..., a data group comprising the sampled data bb1, bb3, ..., and a data group comprising the sampled data cc2, cc4, ... Such data groups are supplied to the D/A converter 28.

According to the present embodiment, the composite color video signal is converted into and transmitted in the form of a pseudo component coded signal alternately comprising one of two kinds of data groups for every one field or 2H. The pseudo component coded signal received via the transmission medium is subjected to an interpolation by use of the sampled data in the pseudo component coded signal of one field or 2H before and is then subjected to an A/D conversion so as to restore the original composite color video signal. The present embodiment therefore has the following advantages.

Firstly, it is possible to reduce the frequency band required for the transmission of the pseudo component coded signal by carrying out the decimation, and it is also possible to fully restore the original composite color video signal substantially without loss of information by carrying out the interpolation.

Secondly, the present invention is especially suited for FM signal transmission because the chrominance subcarrier component having a large energy in the high frequency range will not be transmitted as it is but only after being subjected to the digital signal processing and converted into the pseudo component coded signal in the transmitting system.

Thirdly, it is possible to carry out a jitter compensation and stably transmit the color video signal.

Next, description will be given with respect to a fourth embodiment of the recording system and the reproducing system of the VTR applied with the system according to the present invention. In the recording system of the present embodiment, the composite color video signal is sampled and the sequence of the sampled data is re-arranged so as to produce n kinds of data groups. The n kinds of data groups are then divided into M channels and are converted into analog video signals in M channels in M D/A converters. The analog video signals in M channels are frequency-modulated and are simultaneously recorded on M independent tracks of a recording medium by M recording means. On the other hand, in the reproducing system of the present embodiment, reproduced analog video signals which are simultaneously reproduced from the M independent tracks of the recording medium by M reproducing means are converted into reproduced data in M channels in M A/D converters and are subjected to a signal processing complementary to the signal processing carried out in the recording system, so as to restore the original composite color video signal.

Figure 18:
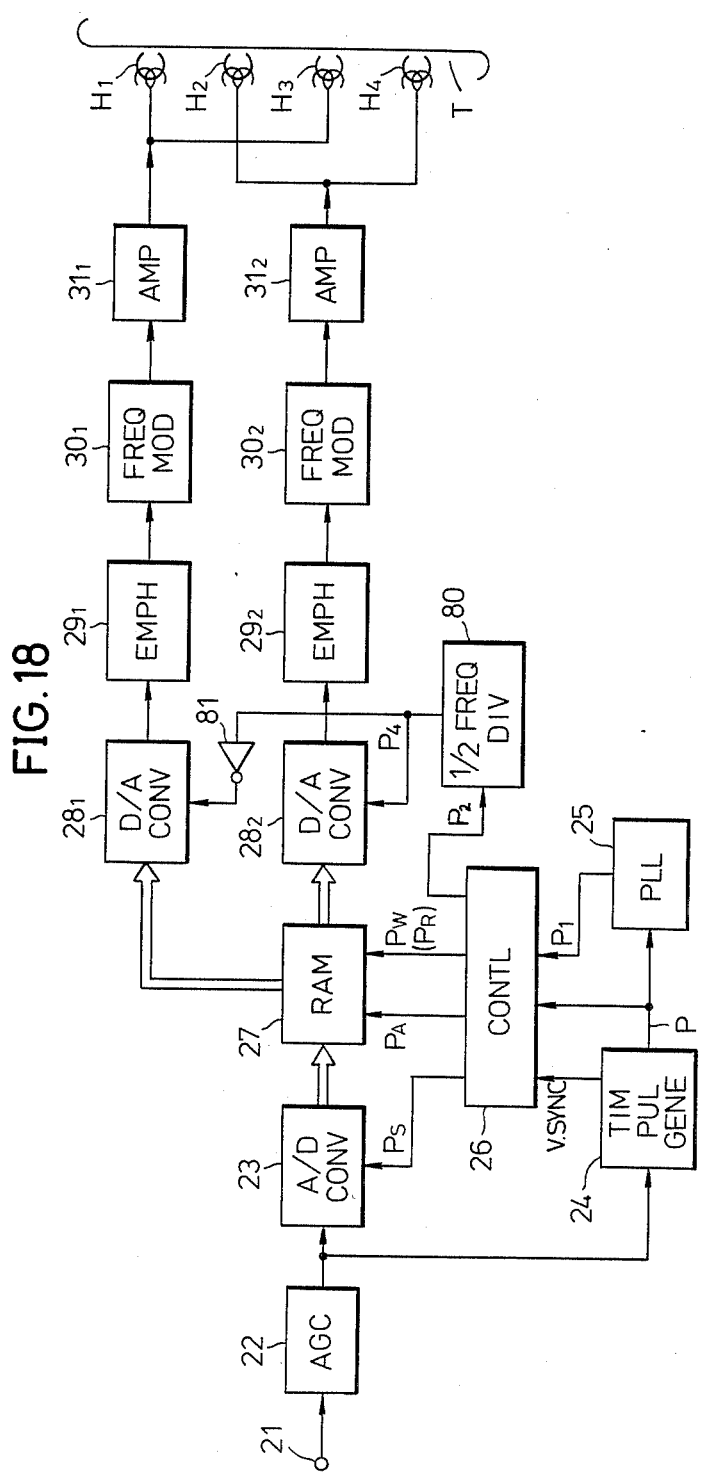
FIG. 18 is a system block diagram showing a fourth embodiment of the recording system of the VTR applied with the system according to the present invention.
Figure 19:
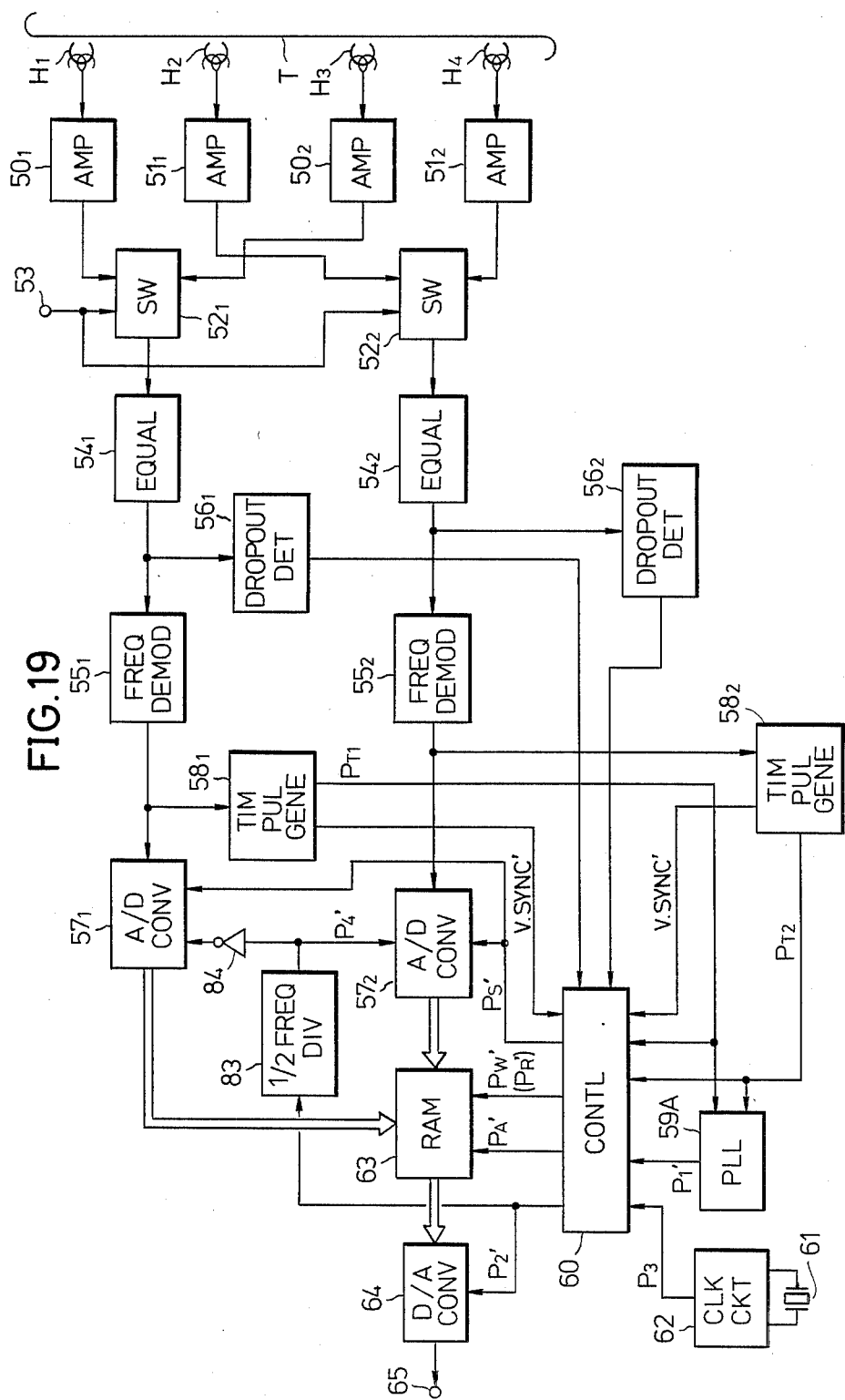
FIG. 19 is a system block diagram showing a fourth embodiment of the reproducing system of the VTR applied with the system according to the present invention.

FIGS. 18 and 19 respectively show the fourth embodiment of the recording system and the reproducing system of the VTR applied with the system according to the present invention. As will be described hereunder, the present embodiment uses four rotary heads H1 through H4, converts the composite color video signal into pseudo component coded signals in two channels, and simultaneously records and reproduces the pseudo component coded signals in the two channels on two independent tracks of the magnetic tape. In other words, M=2 in the present embodiment. In FIGS. 18 and 19, those parts which are the same as those corresponding parts in FIGS. 3 and 10 are designated by the same reference numerals with a subscript "1" for the first channel and with a subscript "2" for the second channel, and description thereof will be omitted.

Figure 20:
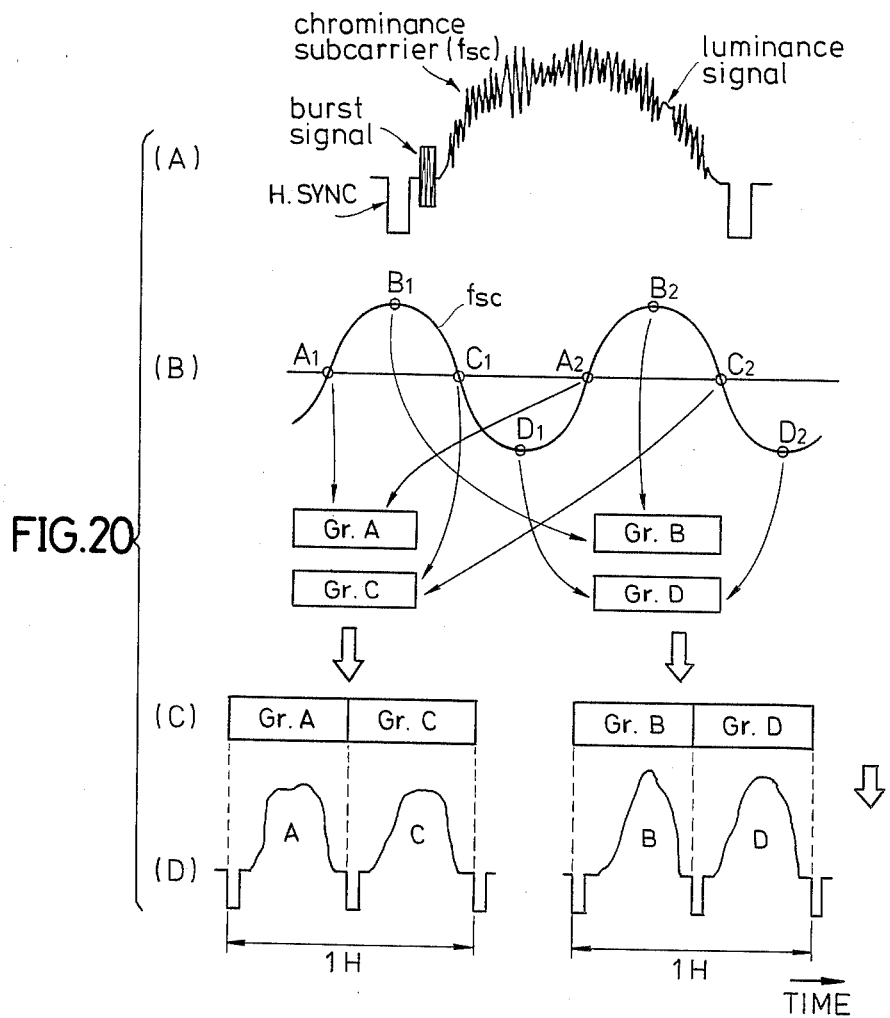
FIGS. 20(A) through 20(D) are diagrams for explaining the operation of the block systems shown in FIGS. 18 and 19.

First, description will be given with respect to the operation of the recording system by referring to FIGS. 18 and 20(A) through 20(D). In FIG. 18, the composite color video signal shown in FIG. 20(A) is applied to the input terminal 21 and is supplied to the A/D converter 23 and the timing pulse generating circuit 24 via the AGC circuit 22.

The timing pulse generating circuit 24 separates the horizontal synchronizing signal from the composite color video signal and generates a timing pulse P having a period of 1H by shaping the separated horizontal synchronizing signal. The timing pulse P is supplied to the PLL circuit 25 and to the control circuit 26. In addition, the timing pulse generating circuit 24 also separates a vertical synchronizing signal V.SYNC from the composite color video signal and supplies this vertical synchronizing signal V.SYNC to the control circuit 26. The PLL circuit 25 generates a pulse signal P1 having a frequency $4f_{sc}$ ($4f_{sc} \approx 14.32$ MHz in the case of the NTSC system), for example, based on the incoming timing pulse P. The pulse signal P1 is supplied to the control circuit 26.

Based on the pulse signal P1, the control circuit 26 generates a sampling pulse $P_S$ having a frequency $4f_{sc}$, a write-in control signal $P_W$, a read-out control signal $P_R$, and a pulse signal P2. The sampling pulse $P_S$ is supplied to the A/D converter 23, the write-in and read-out control signals $P_W$ and $P_R$ are supplied to the RAM 27, and the pulse signal P2 is supplied to a ½ frequency divider 80. The pulse signal P2 is frequency divided by ½ into a pulse signal P4 and is supplied directly to a D/A converter $28_2$ and to a D/A converter $28_1$ via an inverter 81. Furthermore, the control circuit 26 generates an address signal $P_A$ based on the pulse signal P1 and the timing pulse P, and this address signal $P_A$ is supplied to the RAM 27.

The A/D converter 23 samples the composite color video signal with the sampling pulse $P_S$ having the sampling frequency $4f_{sc}$ and produces digital data having a quantization number of seven or eight bits for one sampling point, for example. FIG. 20(B) shows the relationship between the chrominance subcarrier and the sampling points, and circular marks on the chrominance subcarrier indicate the sampling points. In FIG. 20(B), since the sampling frequency is four times the chrominance subcarrier frequency $f_{sc}$, four kinds of sampling points having mutually different phases with respect to the chrominance subcarrier exist in one period of the chrominance subcarrier. Sampled data at the four kinds of sampling points will be denoted by A1, B1, C1 and D1 (and A2, B2, C2, D2 and the like). Hence, the A/D converter 23 supplies to the RAM 27 digital data in which the sampled data A1, B1, C1, D1, A2, B2, C2, D2, ... having the quantization number of seven or eight bits are transmitted in time-sequence.

The RAM 27 has a memory capacity for storing data amounting to a minimum of 2H, and is used to rearrange the digital data from the A/D converter 23. The digital data from the A/D converter 23 is written into predetermined addresses of the RAM 27 responsive to the address signal $P_A$ and the write-in control signal $P_W$, and the sampled data in the digital data are grouped into data groups each amounting to 1H, comprising sampled data obtained with a sampling period $1/f_{sc}$ and having the same phase with respect to the chrominance subcarrier of the composite color video signal. In other words, the sampled data in the digital data are grouped into a data group A comprising the sampled data A1, A2, A3, ..., a data group B comprising the sampled data B1, B2, B3, ..., a data group C comprising the sampled data C1, C2, C3, ..., and a data group D comprising the sampled data D1, D2, D3, ... Next, responsive to the read-out control signal $P_R$, the sampled data in the data groups A and C are read out from the RAM 27 and are supplied to the D/A converter $28_1$, for example, and the sampled data in the data groups B and D are read out from the RAM 27 and are supplied to the D/A converter $28_2$.

The D/A converter $28_1$ converts the digital data from the RAM 27 into an analog video signal in which the sampled data in the data groups A and C are arranged within 1H as shown in FIGS. 20(C) and 20(D). The output analog video signal of the D/A converter $28_1$ is passed through an emphasis circuit $29_1$ and is supplied to a frequency modulator $30_1$. The frequency modulator $30_1$ frequency-modulates the analog video signal from the emphasis circuit $29_1$ and supplies an FM analog video signal to a recording amplifier $31_1$. The recording amplifier $31_1$ supplies the FM analog video signal to rotary heads H1 and H3 which are mounted at diametrical positions on a rotary drum (not shown), and the rotary heads H1 and H3 alternately record the FM analog video signal on the magnetic tape T.

Similarly, the D/A converter $28_2$ converts the digital data from the RAM 27 into an analog video signal in which the sampled data in the data groups B and D are arranged within 1H as shown in FIGS. 20(C) and 20(D). The output analog video signal of the D/A converter $28_2$ is passed through an emphasis circuit $29_2$ and is supplied to a frequency modulator $30_2$. The frequency modulator $30_2$ frequency-modulates the analog video signal from the emphasis circuit $29_2$ and supplies an FM analog video signal to a recording amplifier $31_2$. The recording amplifier $31_2$ supplies the FM analog video signal to rotary heads H2 and H4 which are mounted at diametrical positions on the rotary drum, and the rotary heads H2 and H4 alternately record the FM analog video signal on the magnetic tape T.

As described before, the rotary heads H1 and H3 are mounted on the rotary drum with an angular separation of 180° on a rotational plane of the rotary drum, and the rotary heads H2 and H4 are also mounted on the rotary drum with an angular separation of 180° on the rotational plane of the rotary drum. For this reason, during a first field of the composite color video signal, for example, the rotary head H1 forms a first track on the magnetic tape T by recording the FM analog video signal comprising the sampled data in the data groups A and C, and at the same time, the rotary head H2 forms a second track on the magnetic tape T by recording the FM analog video signal comprising the sampled data in the data groups B and D. Similarly, during a second field of the composite color video signal, the rotary head H3 forms another first track on the magnetic tape T, and at the same time, the rotary head H4 forms another second track on the magnetic tape T.

By repeating the above described operations, the composite color video signal is converted into and transmitted (recorded) as pseudo component coded signals (FM analog video signals) in two channels. For example, in the case of the NTSC system, the frequency band required to transmit the analog video signal in each channel is 3.58 MHz ($=4f_{sc}/2\times\frac{1}{2}=f_{sc}$).

Next, description will be given with respect to the operation of the fourth embodiment of the reproducing system of the VTR applied with the system according to the present invention, by referring to FIG. 19. The FM analog video signals alternately reproduced from the first tracks on the magnetic tape T by the rotary heads H1 and H3 for every one field are supplied to preamplifiers $50_1$ and $50_2$, and outputs of the preamplifiers $50_1$ and $50_2$ are supplied to a switching circuit $52_1$. Similarly, the FM analog video signals alternately reproduced from the second tracks on the magnetic tape T by the rotary heads H2 and H4 for every one field are supplied to preamplifiers $51_1$ and $51_2$, and outputs of the preamplifiers $51_1$ and $51_2$ are supplied to a switching circuit $52_2$.

The switching circuit $52_1$ alternately passes the reproduced signals from the pre-amplifiers $50_1$ and $50_2$ responsive to a switching signal which is obtained via the terminal 53 and has a period dependent on the track scanning times of the rotary heads H1 and H3. In other words, a continuous reproduced FM analog video signal comprising the sampled data in the data groups A and C is produced from the switching circuit $52_1$ and is supplied to a frequency demodulator $55_1$ and a dropout detector $56_1$ via an equalizer circuit $54_1$. Similarly, the switching circuit $52_2$ alternately passes the reproduced signals from the pre-amplifiers $51_1$ and $51_2$ responsive to a switching signal which is obtained via the terminal 53 and has a period dependent on the track scanning times of the rotary heads H2 and H4. In other words, a continuous reproduced FM analog video signal comprising the sampled data in the data groups B and D is produced from the switching circuit $52_2$ and is supplied to a frequency demodulator $55_2$ and a dropout detector $56_2$ via an equalizer circuit $54_2$.

The frequency demodulator $55_1$ frequency-demodulates the reproduced FM analog video signal from the equalizer circuit $54_1$ into a reproduced analog video signal, and this reproduced analog video signal is supplied to an A/D converter $57_1$ and to a timing pulse generating circuit $58_1$. The timing pulse generating circuit $58_1$ separates the horizontal synchronizing signal from the reproduced analog video signal and generates a timing pulse $P_{T1}$ by shaping the separated horizontal synchronizing signal. The timing pulse $P_{T1}$ is supplied to a PLL circuit 59A and to the control circuit 60. In addition, the timing pulse generating circuit $58_1$ separates the vertical synchronizing signal V.SYNC' from the reproduced analog video signal and supplies the separated vertical synchronizing signal V.SYNC' to the control circuit 60.

Similarly, the frequency demodulator $55_2$ frequency-demodulates the reproduced FM analog video signal from the equalizer circuit $54_2$ into a reproduced analog video signal, and this reproduced analog video signal is supplied to an A/D converter $57_2$ and to a timing pulse generating circuit $58_2$. The timing pulse generating circuit $58_2$ separates the horizontal synchronizing signal from the reproduced analog video signal and generates a timing pulse $P_{T2}$ by shaping the separated horizontal synchronizing signal. The timing pulse $P_{T2}$ is supplied to the PLL circuit 59A and to the control circuit 60. In addition, the timing pulse generating circuit $58_2$ separates the vertical synchronizing signal V.SYNC' from the reproduced analog video signal and supplies the separated vertical synchronizing signal V.SYNC' to the control circuit 60. As may be seen from the control circuit 60 shown in FIG. 12 described before, the control circuit 60 uses at least one of the vertical synchronizing signals V.SYNC' from the timing pulse generating circuits $58_1$ and $58_2$ to generate the various timing pulses.

The PLL circuit 59A generates a pulse signal P1' having a frequency $4f_{sc}$ based on the timing pulses $P_{T1}$ and $P_{T2}$ and supplies the pulse signal P1' to the control circuit 60. On the other hand, the clock circuit 62 having the crystal vibrator 61 generates a reference clock signal P3 having a frequency $4f_{sc}$ and supplies this reference clock signal P3 to the control circuit 60.

Based on the pulse signal P1', the control circuit 60 generates a sampling pulse $P_S'$ and a write-in control signal $P_W'$ which are supplied to the A/D converter $57_1$ and $57_2$ and to the RAM 63, respectively. Furthermore, the control circuit 60 generates an address signal $P_A'$ based on the pulse signal P1', and this address signal $P_A'$ is supplied to the RAM 63. The control circuit 60 also generates a read-out control signal $P_R'$ and a pulse signal P2' based on the reference clock signal P3, and the read-out control signal $P_R'$ and the pulse signal P2' are supplied to the RAM 63 and the D/A converter 64, respectively. In addition, the pulse signal P2' is frequency-divided by $\frac{1}{2}$ into a pulse signal P4' in a $\frac{1}{2}$ frequency divider 83. The pulse signal P4' is supplied directly to an output enable terminal of the A/D converter $57_2$ and to an output enable terminal of the A/D converter $57_1$ via an inverter 84.

A time base deviation (jitter) is included in the output signals of the frequency demodulators $55_1$ and $55_2$, and the jitter is accordingly included in the output pulse signal P1' of the PLL circuit 59A. Thus, the sampling pulse $P_S'$, the write-in control signal $P_W'$ and the address signal $P_A'$ generated by the control circuit 60 similarly include the jitter. For this reason, the RAM 63 and the A/D converters $57_1$ and $57_2$ process the signals all including the jitter, and the signal processings in the RAM 63 and the A/D converters $57_1$ and $57_2$ are unaffected by the jitter. After the signals including the jitter are processed in the RAM 63 and the A/D converters $57_1$ and $57_2$, digital data are read out from the RAM 63 responsive to the read-out control signal $P_R'$ and the read out digital data are converted into the original composite color video signal in the D/A converter 64 responsive to the pulse signal P2'. Since the read-out control signal $P_R'$ and the pulse signal P2' are generated based on the reference clock signal P3 which includes no jitter, the signal processings responsive to the read-out control signal $P_R'$ and the pulse signal P2' result in a jitter compensation and the original composite color video signal obtained from the D/A converter 64 includes no jitter.

The A/D converters $57_1$ and $57_2$ sample the respective reproduced signals by the sampling pulse $P_S'$ and produce digital data having a quantization number of seven or eight bits for one sampling point, for example. The sampled data in the data groups A and C are arranged in series in this sequence within 1H in the digital data from the A/D converter $57_1$, and the sampled data in the data groups B and D are arranged in series in this sequence within 1H in the digital data from the A/D converter $57_2$. These digital data from the A/D converters $57_1$ and $57_2$ are supplied to the RAM 63.

The RAM 63 has a memory capacity for storing data amounting to a minimum of 2H, and is used to rearrange the digital data from the A/D converters $57_1$ and $57_2$. The digital data from the A/D converters $57_1$ and $57_2$ are written into predetermined addresses of the RAM 63 responsive to the address signal $P_A'$ and the write-in control signal $P_W'$, and sampled data in each data group of the digital data are extracted sequentially so as to produce a digital data in which the sampled data A1, B1, C1, D1, A2, B2, C2, D2, . . . are transmitted in time-sequence responsive to the read-out control signal $P_R'$. The digital data read out from the RAM 63 responsive to the read-out control signal $P_R'$ are supplied to the D/A converter 64 and are converted into the original composite color video signal responsive to the pulse signal $P2'$ and is outputted via the output terminal 65.

On the other hand, the dropout detectors $56_1$ and $52_2$ each generate a dropout detection signal when a dropout is detected in the reproduced signal from the corresponding one of the equalizer circuits $54_1$ and $54_2$, and each dropout detection signal is supplied to the control circuit 60. When the dropout detection signal is received, the control circuit 60 controls the RAM 63 so as to read out the digital data which are related to the horizontal scanning period of 2H before the present horizontal scanning period and have the same chrominance subcarrier phase as the present horizontal scanning period. In this case, the D/A converter 64 subjects the digital data related to the horizontal scanning period of 2H before to a D/A conversion and supplies a resulting composite color video signal to the output terminal 65 as the composite color video signal related to the present horizontal scanning period.

In the present embodiment, the composite color video signal is transmitted in the form of the pseudo component coded signals in two channels, but it is of course possible to transmit the composite color video signal in the form of pseudo component coded signals in three or more channels. Further, the sampling frequency is not limited to $4f_{sc}$ and may be selected to $nf_{sc}$, where n is an integer greater than or equal to two.

The signal processing in the present embodiment may be carried out by use of CCDs instead of using digital circuits. In addition, since the sampling points having the same phase with respect to the chrominance subcarrier have a regularity also in the PAL system, the present embodiment may be applied to the transmission of the PAL system composite color video signal by appropriately varying parameters of the present embodiment.

According to the present embodiment, the sampled data of the composite color video signal having the same phase with respect to the chrominance subcarrier are grouped, so as to transmit the composite color video signal in the form of pseudo component coded signals in a plurality of channels. Hence, it is possible to eliminate the problems of the conventional composite color video signal transmission system, and the following advantages are obtainable when the present invention is applied to the VTR.

Firstly, the frequency band required for the signal transmission in one channel can be made small because the composite color video signal is transmitted in the form of pseudo component coded signals in a plurality of channels, and the total frequency band allocated for the composite color video signal is sufficiently wide. Hence, it is possible to obtain a high resolution.

Secondly, no waveform distortion is generated because the composite color video signal is processed digitally before being transmitted.

Thirdly, it is possible to carry out a jitter compensation and stably transmit the color video signal.

Fourthly, it is possible to apply the present invention to the VTR which forms tracks on the magnetic tape without a guard band between two successive tracks by simply using a plurality of pairs of rotary heads having gaps of mutually different azimuth angles, because the composite color video signal is not separated into the luminance signal and the carrier chrominance signal at the time of the recording.

Further, the present invention is not limited to these embodiments, but various variations and modifications may be made without departing from the scope of the present invention.

What is claimed is:

1. A color video signal transmission system comprising:

analog-to-digital converting means for sampling an input composite color video signal at a sampling frequency $nf_{sc}$ and for producing first data, where n is a natural number and $f_{sc}$ denotes a chrominance subcarrier frequency of the input composite color video signal, said first data comprising a sequence of digital data;

data rearranging means for rearranging the sequence of the digital data of said first data to form second data including n different data groups, each data group comprising every nth digital datum in the first data, said every nth digital datum having been sampled with a period $1/f_{sc}$ and having the same phase with respect to the chrominance subcarrier of the input composite color video signal within one horizontal scanning period, the n data groups being arranged in series for each horizontal scanning period within said second data; and digital-to-analog converting means for converting said second data into an analog video signal and for supplying the analog video signal to a transmission medium.

2. A color video signal transmission system as claimed in claim 1 in which said analog-to-digital converting means comprises means for producing the first data by sampling only a video information portion of the input composite color video signal, excluding horizontal and/or vertical synchronizing signal portions of the input composite color video signal.

3. A color video signal transmission system as claimed in claim 1 which further comprises control means for generating a plurality of control signals based on synchronizing signals within the input composite color video signal, said data converting means comprising memory means for producing said second data by writing therein and reading out therefrom said first data responsive to write-in and read-out control signals from said control means, said analog-to-digital converting means and said digital-to-analog converting means being controlled responsive to respective control signals from said control means.

4. A color video signal transmission system as claimed in claim 1 in which said transmission medium is a recording medium, said digital-to-analog converting means comprising recording means for recording said analog video signal on the recording medium.

5. A color video signal transmission system comprising:
- analog-to-digital converting means for sampling an input composite color video signal at a sampling frequency $nf_{sc}$ and for producing first data, where n is a natural number and $f_{sc}$ denotes a chrominance subcarrier frequency of the input composite color video signal;
- data converting means for converting said first data into n data groups each comprising sampled data in the first data obtained for every sampling period $1/f_{sc}$ and having the same phase with respect to the chrominance subcarrier of the input composite color video signal within one horizontal scanning period and for producing second data in which all of the n data groups are being arranged in series for each horizontal scanning period;
- digital-to-analog converting means for converting said second data into an analog video signal and for supplying the analog video signal to a transmission medium; and
- control means for generating a plurality of control signals based on synchronizing signals within the input composite color video signal,
- said data converting means comprising memory means for producing said second data by writing therein and reading out therefrom said first data responsive to write-in and read-out control signals from said control means, said analog-to-digital converting means and said digital-to-analog converting means being controlled responsive to respective control signals from said control means,
- said control means comprising a timing pulse generating circuit for generating first and second pulse signals based on the synchronizing signals within the input composite color video signal, a phase locked loop circuit for generating a third pulse signal based on said first pulse signal, and a control circuit for generating based on said first through third pulse signals the control signals for said analog-to-digital converting means and said digital-to-analog converting means, an address signal and the write-in and read-out control signals for said memory means.

6. A color video signal transmission system comprising:
- first analog-to-digital converting means for sampling an input composite color video signal at a sampling frequency $nf_{sc}$ and for producing first data, where n is a natural number and $f_{sc}$ denotes a chrominance subcarrier frequency of the input composite color video signal, said first data comprising a sequence of digital data;
- first data rearranging means for rearranging the sequence of the digital data of said first data to form second data including n different data groups, each data group comprising every nth digital datum in the first data, said every nth digital datum having been sampled with a period $1/f_{sc}$ and having the same phase with respect to the chrominance subcarrier of the input composite color video signal within one horizontal scanning period, the n data groups being arranged in series for each horizontal scanning period within said second data;
- first digital-to-analog converting means for converting the second data into an analog video signal and for supplying the analog video signal to a transmission medium;
- second analog-to-digital converting means for subjecting the analog video signal received via the transmission medium to an analog-to-digital conversion so as to restore the second data;
- second data rearranging means for successively extracting digital data at each sampling point from each of the n data groups within the second data from said second analog-to-digital converting means and for rearranging extracted digital data so as to restore the first data; and
- second digital-to-analog converting means for subjecting the first data from said second data rearranging means to a digital-to-analog conversion so as to restore and output the original input composite video signal.

7. A color video signal transmission system as claimed in claim 6 which further comprises first control means for generating a plurality of control signals based on synchronizing signals within the input composite color video signal and second control means for generating a plurality of control signals based on said analog video signal received via said transmission medium, said first data rearranging means comprising first memory means for producing said second data by writing therein and reading out therefrom said first data responsive to write-in and read-out control signals from said first control means, said first analog-to-digital converting means and said first digital-to-analog converting means being controlled responsive to respective control signals from said first control means, said second data rearranging means comprising second memory means for producing said first data by writing therein and reading out therefrom said second data responsive to write-in and read-out control signals from said second control means, said second analog-to-digital converting means and said second digital-to-analog converting means being controlled responsive to respective control signals from said second control means.

8. A color video signal transmission system as claimed in claim 6 in which said transmission medium is a recording medium, said first digital-to-analog converting means comprising recording means for recording said analog video signal on the recording medium, said second analog-to-digital converting means comprising reproducing means for reproducing said analog video signal from the recording medium.

9. A color video signal transmission system comprising:
- first analog-to-digital converting means for sampling an input composite color video signal at a sampling frequency $nf_{sc}$ and for producing first data, where n is a natural number and $f_{sc}$ denotes a chrominance subcarrier frequency of the input composite color video signal;
- first data converting means for converting the first data into n data groups each comprising sample data in the first data obtained for every sampling period $1/f_{sc}$ and having the same phase with respect to the chrominance subcarrier of the input composite color video signal within one horizontal scanning period and for producing second data in which all of the n data groups are arranged in series for each horizontal scanning period;
- first digital-to-analog converting means for converting the second data into an analog video signal and for supplying the analog video signal to a transmission medium;
second analog-to-digital converting means for subjecting the analog video signal received via the transmission medium to an analog-to-digital conversion so as to restore the second data;
second data converting means for successively extracting sampled digital data at each sampling point from each of the n data groups within the second data from said second analog-to-digital converting means so as to restore the first data; and
second digital-to-analog converting means for subjecting the first data from said second data converting means to a digital-to-analog conversion so as to restore and output the original input composite color video signal,
said first analog-to-digital converting means comprising means for producing the first data by sampling only a video information portion of the input composite color video signal, excluding horizontal and-/or vertical synchronizing signal portions of the input composite color video signal, and said second digital-to-analog converting means comprising means for adding horizontal and/or vertical synchronizing signal portions to a video information portion which is obtained by subjecting the first data from said second data converting means to the digital-to-analog conversion, so as to restore and output the original input composite color video signal.

10. A color video signal transmission system comprising:
first analog-to-digital converting means for sampling an input composite color video signal at a sampling frequency $nf_{sc}$ and for producing first data, where n is a natural number and $f_{sc}$ denotes a chrominance subcarrier frequency of the input composite color video signal;
first data converting means for converting the first data into n data groups each comprising sampled data in the first data obtained for every sampling period $1/f_{sc}$ and having the same phase with respect to the chrominance subcarrier of the input composite color video signal within one horizontal scanning period and for producing second data in which all of the n data groups are arranged in series for each horizontal scanning period;
first digital-to-analog converting means for converting the second data into an analog video signal and for supplying the analog video signal to a transmission medium;
second analog-to-digital converting means for subjecting the analog video signal received via the transmission medium to an analog-to-digital conversion so as to restore the second data;
second data converting means for successively extracting sampled data at each sampling point from each of the n data groups within the second data from said second analog-to-digital converting means so as to restore the first data;
second digital-to-analog converting means for subjecting the first data from said second data converting means to a digital-to-analog conversion so as to restore and output the original input composite color video signal;
first control means for generating a plurality of control signals based on synchronizing signals within the input composite color video signal; and
second control means for generating a plurality of control signals based on said analog video signal received via said transmission medium,
said first data converting means comprising first memory means for producing said second data by writing therein and reading out therefrom said first data responsive to write-in and read-out control signals from said first control means, said first analog-to-digital converting means and said first digital-to-analog converting means being controlled responsive to respective control signals from said first control means, said second data converting means comprising second memory means for producing said first data by writing therein and reading out therefrom said second data responsive to write-in and read-out control signal from said second control means, said second analog-to-digital converting means and said second digital-to-analog converting means being controlled responsive to respective control signals from said second control means,
said first control means comprising a first timing pulse generating circuit for generating first and second pulse signals based on the synchronizing signals within the input composite color video signal, a first phase locked loop circuit for generating a third pulse signal based on said first pulse signal, and a first control circuit for generating based on said first through third pulse signals the control signals for said first analog-to-digital converting means and said first digital-to-analog converting means, an address signal and the write-in and read-out control signals for said first memory means, and said second control means comprising a second timing pulse generating circuit for generating fourth and fifth pulse signals based on said analog video signal received via said transmission medium, a second phase locked loop circuit for generating a sixth pulse signal based on said fourth pulse signal, and a second control circuit for generating based on said fourth through sixth pulse signals the control signals for said second analog-to-digital converting means and said second digital-to-analog converting means, an address signal and the write-in and read-out control signals for said second memory means.

11. A color video signal transmission system comprising:
first analog-to-digital converting means for sampling an input composite color video signal at a sampling frequency $nf_{sc}$ and for producing first data, where n is an integer greater than or equal to two and $f_{sc}$ denotes a chrominance subcarrier frequency of the input composite color video signal;
first data converting means for converting the first data into n data groups each comprising sampled data in the first data obtained for every sampling period $1/f_{sc}$ and having the same phase with respect to the chrominance subcarrier of the input composite color video signal within one horizontal scanning period and for producing second data in which sampled data in n/2 data groups arranged in series and sampled data in remaining n/2 data groups arranged in series are alternately transmitted for every predetermined time period by carrying out a decimation;
first digital-to-analog converting means for converting the second data into an analog video signal and for supplying the analog video signal to a transmission medium;

second analog-to-digital converting means for subjecting the analog video signal received via the transmission medium to an analog-to-digital conversion so as to restore the second data;

second data converting means for carrying out an interpolation on the n/2 data groups within the second data from said second analog-to-digital converting means by use of n/2 data groups within the second data which is obtained from said second analog-to-digital converting means the predetermined time period before so as to restore the first data; and second digital-to-analog converting means for subjecting the first data from said second data converting means to a digital-to-analog conversion so as to restore and output the original input composite color video signal.

12. A color video signal transmission system as claimed in claim 11 in which said predetermined time period is set to one field.

13. A color video signal transmission system as claimed in claim 11 in which said predetermined time period is set to two horizontal scanning periods.

14. A color video signal transmission system comprising:

first analog-to-digital converting means for sampling an input composite color video signal at a sampling frequency $nf_{sc}$ and for producing first data, where n is an integer greater than or equal to two and $f_{sc}$ denotes a chrominance subcarrier frequency of the input composite color video signal, said first data comprising a sequence of digital data;

first data rearranging means for decimating and rearranging the sequence of the digital data of said first data to form second data including 2n different data groups, each data group comprising every nth digital datum in the first data, said every 2nth digital datum having been sampled with a period $\frac{1}{2}f_{sc}$ and having the same phase with respect to the chrominance subcarrier of the input composite color video signal within one horizontal scanning period said second data being formed so that n data groups consisting of odd numbered digital data in said first data and n data groups consisting of even numbered digital data in said first data are alternately transmitted for every predetermined time period;

first digital-to-analog converting means for converting the second data into an analog video signal and for supplying the analog video signal to a transmission medium;

second analog-to-digital converting means for subjecting the analog video signal received via the transmission medium to an analog-to-digital conversion so as to restore the second data;

second data rearranging means for carrying out an interpolation on the n data groups within the second data from said second analog-to-digital converting means by use of n data groups within the second data which are obtained from said second analog-to-digital converting means the predetermined time period before so as to restore the first data; and second digital-to-analog converting means for subjecting the first data from said second data converting means to a digital-to-analog conversion so as to restore and output the original input composite color video signal.

15. A color video signal transmission system as claimed in claim 14 in which said predetermined time period is set to one field.

16. A color video signal transmission system comprising:

first analog-to-digital converting means for sampling an input composite color video signal at a sampling frequency $nf_{sc}$ and for producing first data, where n is an integer greater than or equal to two and $f_{sc}$ denotes a chrominance subcarrier frequency of the input composite color video signal;

first data converting means for converting the first data into n data groups each comprising sampled data in the first data obtained for every sampling period $1/f_{sc}$ and having the same phase with respect to the chrominance subcarrier of the input composite color video signal within one horizontal scanning period and for producing second data in which n data consisting of odd numbered sampled data from each data group arranged in series and n data consisting of even numbered sampled data from each data group arranged in series are alternately transmitted for every predetermined time period by carrying out a decimation, said predetermined time period being set to two horizontal scanning periods;

first digital-to-analog converting means for converting the second data into an analog video signal and for supplying the analog video signal to a transmission medium;

second analog-to-digital converting means for subjecting the analog video signal received via the transmission medium to an analog-to-digital conversion so as to restore the second data;

second data converting means for carrying out an interpolation on the n data within the second data from said second analog-to-digital converting means by use of n data within the second data which is obtained from said second analog-to-digital converting means the predetermined time period before so as to restore the first data; and second digital-to-analog converting means for subjecting the first data from said second data converting means to a digital-to-analog conversion so as to restore and output the original input composite color video signal.

17. A color video signal transmission system comprising:

first analog-to-digital converting means for sampling an input composite color video signal at a sampling frequency $nf_{sc}$ and for producing first data, where n is an integer greater than or equal to two and $f_{sc}$ denotes a chrominance subcarrier frequency of the input composite color video signal;

first data converting means for converting the first data into n data groups each comprising sampled data in the first data obtained for every sampling period $1/f_{sc}$ and having the same phase with respect to the chrominance subcarrier of the input composite color video signal within one horizontal scanning period and for producing in parallel second data comprising the n data groups in M channels, where $2 \leq M \leq n$;

first digital-to-analog converting means for independently converting the second data in the M channels into analog video signals in M channels and for supplying the analog video signal to a transmission medium in M channels simultaneously;

second analog-to-digital converting means for independently subjecting the analog video signals received via the transmission medium in the M channels to an analog-to-digital conversion so as to restore the second data in the M channels;

second data converting means for converting the second data in the M channels from said second analog-to-digital converting means into the n data groups so as to restore the first data from the n data groups; and second digital-to-analog converting means for subjecting the first data from said second data converting means to a digital-to-analog conversion so as to restore and output the original input composite color video signal.

18. A color video signal transmission system as claimed in claim 17 in which said transmission medium is a recording medium, said first digital-to-analog converting means comprising recording means for simultaneously recording the analog video signals in the M channels on M independent tracks of the recording medium, said second analog-to-digital converting means comprising reproducing means for simultaneously reproducing the analog video signals in the M channels from the M independent tracks of the recording medium.

* * * * *